(12) United States Patent
Feinberg et al.

(10) Patent No.: US 11,044,091 B1
(45) Date of Patent: Jun. 22, 2021

(54) SYSTEM AND METHOD FOR SECURELY TRANSMITTING NON-PKI ENCRYPTED MESSAGES

(71) Applicant: Secure Channels, Inc., Irvine, CA (US)

(72) Inventors: Michael R. Feinberg, Irvine, CA (US); Richard J. Blech, Irvine, CA (US)

(73) Assignee: Secure Channels Inc., Irvine, CA (US)

( * ) Notice: Subject to any disclaimer, the term of this patent is extended or adjusted under 35 U.S.C. 154(b) by 136 days.

(21) Appl. No.: 16/129,698

(22) Filed: Sep. 12, 2018

Related U.S. Application Data

(60) Provisional application No. 62/643,645, filed on Mar. 15, 2018.

(51) Int. Cl.
*H04L 29/06* (2006.01)
*H04L 9/32* (2006.01)
*H04L 9/08* (2006.01)
*H04L 9/06* (2006.01)

(52) U.S. Cl.
CPC .......... *H04L 9/3213* (2013.01); *H04L 9/0656* (2013.01); *H04L 9/0861* (2013.01); *H04L 63/062* (2013.01)

(58) Field of Classification Search
CPC ... H04L 9/3213; H04L 63/062; H04L 9/0861; H04L 9/0656
See application file for complete search history.

(56) References Cited

U.S. PATENT DOCUMENTS

| | | | | |
|---|---|---|---|---|
| 9,590,951 | B2* | 3/2017 | Tomkow | H04L 9/0656 |
| 10,154,371 | B1* | 12/2018 | Rahat | H04W 4/02 |
| 2012/0204032 | A1* | 8/2012 | Wilkins | H04L 63/0428 |
| | | | | 713/170 |
| 2012/0331088 | A1* | 12/2012 | O'Hare | G06F 21/6227 |
| | | | | 709/214 |
| 2015/0222517 | A1* | 8/2015 | McLaughlin | G06F 11/3051 |
| | | | | 713/156 |
| 2017/0085545 | A1* | 3/2017 | Lohe | G06Q 20/065 |
| 2017/0132181 | A1* | 5/2017 | Van As | G06F 11/3476 |
| 2017/0264439 | A1* | 9/2017 | Muhanna | H04W 12/06 |
| 2018/0046658 | A1* | 2/2018 | Han | G06F 16/2272 |

\* cited by examiner

*Primary Examiner* — Mahfuzur Rahman
(74) *Attorney, Agent, or Firm* — Rutan & Tucker, LLP

(57) ABSTRACT

An embodiment of an automatic key delivery system is described, An automatic key delivery system comprises the following operations. Herein, a first token is generated and provided to a first network device. Thereafter, a first key value pair, including the first token and a first key segment of a cryptographic key, is received by a first relay server and a second key value pair, including the first token and a second key segment of the cryptographic key, is received from a second relay server. In response, a second token to be provided to the first relay server and the second relay server. Thereafter, the first and second key segment are returned from the first and second relay servers based on usage of the second token as a lookup in order to recover the cryptographic key for decryption of an encrypted content from the first network device.

18 Claims, 11 Drawing Sheets

SYSTEM AND METHOD FOR SECURELY TRANSMITTING NON-PKI ENCRYPTED MESSAGES

CROSS-REFERENCE TO RELATED APPLICATIONS

This application claims the benefit of priority of U.S. Provisional Application No. 62/643,645, filed Mar. 15, 2018, the entire contents of which are incorporated by reference herein.

EXPORT CONTROL

Information in this patent application is controlled by the U.S. Government and authorized for access only by U.S. persons and licensed non-U.S. persons. Please contact the assignee, Secure Channels, Inc., for further guidance if you wish to give access to the subject application to a non-U.S. person. This statement attaches to any use or incorporation of said patent application into other applications or any other use.

FIELD

Embodiments of the disclosure relate to the field of cryptography. More specifically, an embodiment of the disclosure is directed to a cryptographic key delivery system that supports cryptographically secure transmissions without reliance on Public Key Infrastructure (PKI).

GENERAL BACKGROUND

The transmission of digital content as messages over public networks, such as electronic mail (email) messages, text messages, or Voice over IP (VoIP) messages for example, has become an integral part of daily life for individuals and businesses. Herein, a "message" may be construed as one or more packets or frames, or any other collection of digital content sent in a prescribed format. Transmitting messages via a public network, such as the Internet for example, typically requires the use of various networked electronic devices, generally referred to as "hops." A message is transferred across multiple hops along an intended communication path from a sender to a receiver.

Encryption is a common strategy for scrambling the content of messages sent over the Internet, Such scrambling renders the content unreadable by any unauthorized receiver, which protects the sender against interlopers attempting to intercept messages in transmit and interpret their contents. Secure Socket Layer (SSL) and Transport Layer Security (TLS) are commonly used protocols for encrypting messages transmitted over the Internet.

Asymmetric cryptographic schemes, such as SSL and TLS for example, utilize public/private key authorization and digital certificate authentication as requisite mechanisms for encryption and decryption. Unfortunately, asymmetric cryptographic schemes are subject to a few disadvantages. For instance, given the explosive growth of cryptographically secure electronic devices, especially secure sensors or other types of Internet of Things (IoT) devices, one disadvantage is the need to install digital certificates on each secure electronic device in order for that device to support asymmetric cryptographic communications. This required installation is costly and difficult to perform and/or manage for companies producing tens or hundreds of millions of IoT devices. Furthermore, besides the difficulty of installing digital certificates, another disadvantage surrounds the subsequent administration of these digital certificate. The amount of resources to monitor hundreds of millions of digital certificates installed in these secure electronic devices, such as simply confirming validity of the installed digital certificates, is staggering.

Yet another disadvantage associated with asymmetric cryptography is directed to potential and known problems experienced by asymmetric cryptographic deployments in general. Examples of potential and known problems include the threat caused by compromised certificate authorities, a lack of "perfect forward secrecy," and Unicode-character man-in-the-middle attacks that can exist on compromised wireless networks. Such attacks spoof communications using "homograph-similar" address attacks, which implies that a man-in-the-middle attack is still possible, even when using SSL.

Therefore, a key delivery system for reliable and secure transmission of symmetric keys, such as one-time pad (OTP) keys for example, would harden cryptographic security for communications over a network and avoid the difficulties experienced by asymmetric cryptographic systems that are reliant on digital certificates for key delivery.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
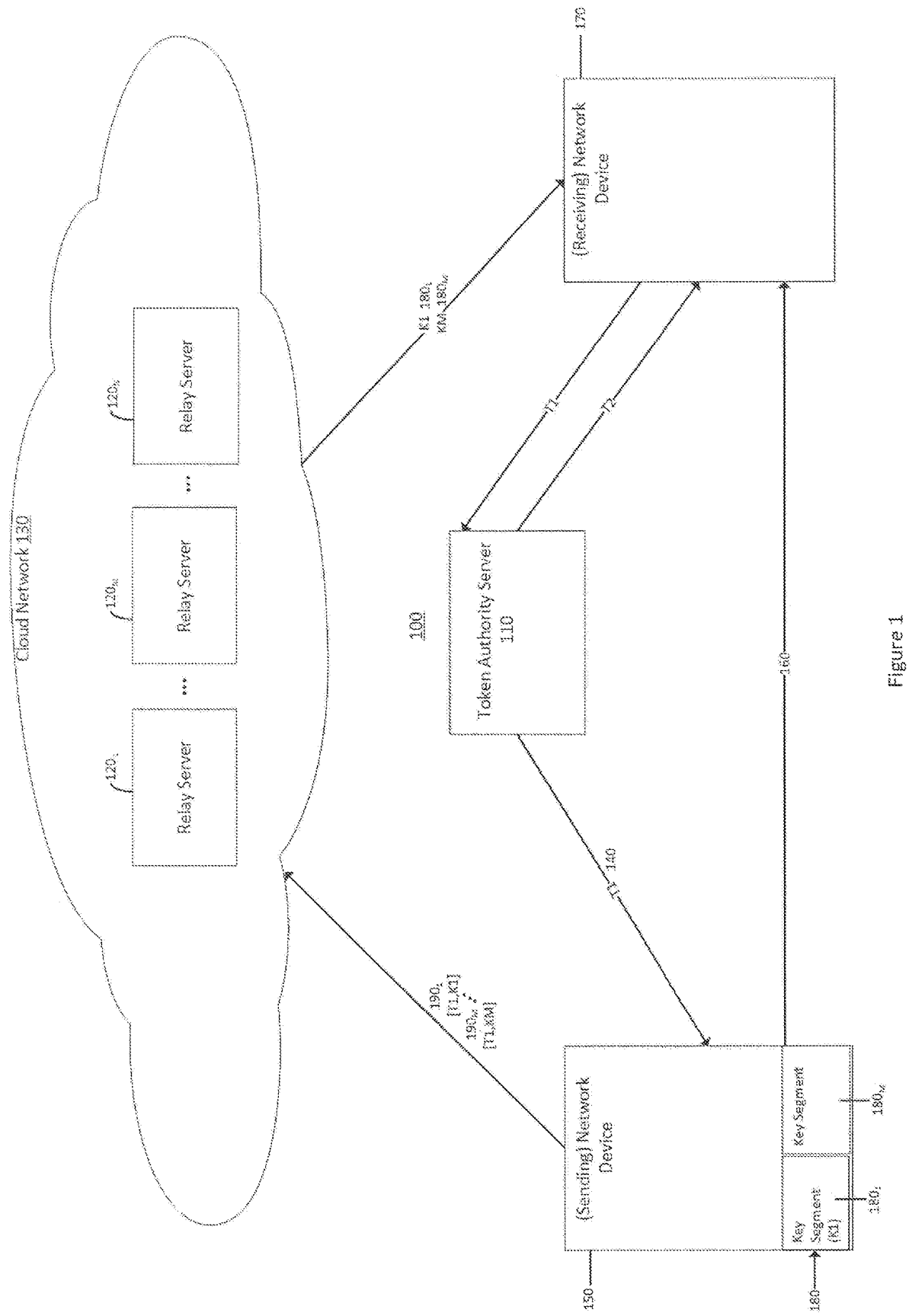
FIG. 1 is an exemplary embodiment of the general architecture of a key delivery system.

Embodiments of the disclosure are directed to a key delivery system that is configured to provide secure delivery of a cryptographic key from a sending network device to a targeted, receiving network device. In particular, the key delivery system utilizes a streaming encryption scheme for hyper-securing data without the use of the Public Key Infrastructure (PKI) paradigm.

According to one embodiment of the disclosure, the key delivery system may be implemented as a subscriber-based system in which an entity (hereinafter, "potential subscriber") accesses an identity management system to subscribe to services offered by the key delivery system. The subscription process includes (a) registration of the potential subscriber and/or configuration of a network device to operate within the key delivery system (e.g., register an identifier of the network device, install or at least ensure installation of one or more cryptographic ciphers and any other software modules necessary to support the key delivery system, etc.), and (b) selection of a subscription plan for the potential subscriber. In particular, the identity management system is accessible through a portal, which provides potential subscribers access to one or more webpages. These webpage(s) may constitute a web form that is rendered by a conventional web browser and allows for entry of subscriber details and selection of subscription attributes using conventional "user interactive" techniques.

Herein, the subscription attributes may include certain performance-based attributes (e.g., selected encryption strength represented by a key length setting and/or a key separation setting identifying a degree of segmentation of a cryptographic key prior to being uploaded to relay servers in the cloud network, quality of service "QoS" settings such as minimum guaranteed throughput thresholds, etc.) and/or administrative-based attributes (e.g., subscription level; automated alert notification parameters, etc.). Also, the subscription attributes may further include subscriber-based attributes that involve subscriber imposed permissions and/or restrictions directed to message encryption and key handling that allow a subscriber to customize its subscription to the key delivery system.

Herein, the key delivery system features a double-blind configuration in which none of the components forming the key delivery system stores identifying information directed to the sending network device, one or more targeted receiving network devices, and the intermediary network devices (e.g., token authority server, relay servers, etc.). As described below, the sending network device is configured to generate a plurality of key value pairs (KVPs) for use in cryptographically securing a particular transmission directed to a targeted, receiving network device. Each of the KVPs includes a first token (T1) received from a token authority server and a portion of cryptographic key (SK) generated by the sending network device. According to one embodiment of the disclosure, the cryptographic key (SK) may be a one-time pad (OTP).

More specifically, to protect its secrecy during conveyance from the sending network device to the receiving network device, the cryptographic key (SK) is separated into "M" key segments. Each key segment may be equivalent in length (e.g., equal number of bits or bytes) or may vary in length where some or all of the key segments have different lengths. According to one embodiment of the disclosure, contemporaneous with the encrypted transmission to the receiving network device, the sending network device is configured to transmit multiple KVPs to different relay servers within a cloud network. As described below, as an illustrative example in which the cryptographic key (SK) is separated into two key segments, the sending network device transmits a first KVP, including a first key segment (K1) of the cryptographic key (SK) and the first token (T1), to a first relay server. Additionally, the sending network device transmits a second KVP to a second relay server residing in a different geographic region than the first relay server. The second KVP includes a second key segment (K2) of the cryptographic key (SK) and the first token (T1).

Hence, the relay servers may be randomly (or pseudo-randomly) selected from a group of relay servers that are deployed within the cloud network and operate as part of the key delivery system. For this embodiment, the cloud network may be a public cloud network and the relay servers are positioned at different geographic regions where greater geographic separation of the KVPs may assist in preventing discovery of the cryptographic key (SK). In particular, where the Amazon® Web Services (AWS) operates as the cloud network, the relay servers may be Elastic Compute Cloud (EC2) server nodes located at distributed geographic locations. However, in lieu of a public cloud network, the cloud network may be deployed as a private cloud network.

According to one embodiment of the disclosure, instead of retaining the KVPs received from the sending network device, the relay servers may be adapted to perform a random or pseudo-random shuffling of the KVPs to different relay servers (hereinafter, "reassigned relay servers"). The shuffling maintains that each key segment and token combination (KVP) is retained by a different reassigned relay server, but ensures that the locations of the key segments are obfuscated from the sending network device. As this shuffling (re-transmission) of the KVPs to different reassigned relay servers is conducted in a random or pseudo-random manner, each relay server features a retry capability in the event that one of the KVPs is sent to a reassigned relay server that already retains a key segment identified by the same assigned token (T1). This retry capability relies on the reassigned relay server acknowledging receipt of a KVP after confirmation that no other key segments with the same token (T 1) are currently retained by the reassigned relay server. Otherwise, based on a denial or lack of an acknowledgement message from a targeted reassigned relay server, the relay server retransmits the KVP to another reassigned relay server. This process may continue until an acknowledgement message is received confirming receipt and retention of the KVP.

Thereafter, according to an embodiment of the disclosure, each of the reassigned relay servers may be configured to initiate communications with the token authority server in efforts to obtain a substitute token (hereinafter, a "second token" (T2) for the token (T 1)). When requested, this communication for a substitute token (T2), in the form of a token change request message, is conducted to further obfuscate the key segments forming the cryptographic key (SK) from the sending network device. Responsive to receipt of the token change request message from an authenticated relay server, the token authority server generates (or causes the generation of) a second token (T2). Data identifying the relationship between the first token (T1) and the second token (T2) is stored in ephemeral memory (token data store) accessible to the token authority server. For this embodiment, with the KVP, the reassigned relay servers overwrite the first token (T1) with the received second token (T2) so that subsequent queries for a particular cryptographic key require designation of the second token (T2) in lieu of the first token (T1).

According to one embodiment of the disclosure, as described in FIGS. 1-7B, in a secure transmission from the sending network device to the receiving network device, the sending network device provides the token (T1) and content encrypted with a cryptographic key (SK) to one or more targeted receiving network devices. For a unicast transmission, a single receiving network device is targeted to receive the encrypted content while multiple receiving network devices may be targeted by a multicast transmission. As the operations are similar, for clarity sake, the secure transmission will be discussed as unicast transmission.

Upon receipt of the secure transmission, the receiving network device communicates with the token authority server by transmitting a token lookup request message including the token (T1), which prompts return of the second token (T2) in a token lookup response message from the token authority server. In particular, the token authority server receives the token (T1) and uses the token (T1) as a lookup to access the second token (T2) from the token data store. Thereafter, the token authority server returns the second token (T2) to the receiving network device. Additionally, upon confirmed receipt of the token lookup response message by the receiving network device, the token authority server deletes a storage entry with the T1/T2 mapping or tags this entry to be overwritten.

Upon receipt of the second token (T2), the receiving network device generates one or more key segment request messages (e.g., separate unicast messages or a multicast message) to each relay server of the group of relay servers that are deployed within the cloud network and operate as part of the key delivery system. Each key segment request message includes the second token (T2) and prompts the recipient relay servers to return any stored key segment corresponding to the second token (T2). Upon receipt of the key segments from the reassigned relay servers (i.e., at least two different relay servers located at different locations within the cloud network), the receiving network device may recover the cryptographic key (SK) for decrypting the encrypted content within the received transmission.

It is contemplated that the methods, functionality and features described herein may be embodied in whole or in part as software or firmware (defined below), which operates on any computing device or on a distributed system deploying one or more computing devices. Alternatively, it is contemplated that the methods, functionality and features described herein may be embodied, in whole or in part, as hardware.

I. Terminology

In the following description, certain terminology is used to describe aspects of the invention. For example, in certain situations, the terms "logic" and "component" are representative of hardware, firmware and/or software that is configured to perform one or more functions. As hardware, logic (or a component) may include circuitry having data processing or storage functionality. Examples of such processing or storage circuitry may include, but is not limited or restricted to the following: a processor; one or more processor cores; a programmable gate array; an I/O controller (e.g., network interface controller, disk controller, memory controller, etc.); an application specific integrated circuit; receiver, transmitter and/or transceiver circuitry; semiconductor memory; combinatorial logic, or combinations of one or more of the above components.

Logic (or a component) may be in the form of one or more software modules, such as executable code in the form of an operating system component, an executable application, firmware, an application programming interface (API), one or more subroutines, a function, a procedure, an applet, a plug-in, a servlet, a Component Object Model (COM) object, a routine, source code, object code, a shared library/dynamic linked library, a script, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or portable memory device; and/or a semiconductor memory. As firmware, the executable code is stored in persistent storage.

A "network device" generally refers to an electronic device with access to a network via a communication interface (e.g., a network interface controller, wireless transceiver, a physical or logical port, etc.). Examples of a network device may include, but are not limited or restricted to the following: a server; a router or other signal propagation networking equipment (e.g., a wireless or wired access point); a set-top box; a video-game console; or an endpoint (e.g., a stationary or portable computer including a desktop computer, laptop, electronic reader, netbook or tablet; a smart phone; or wearable technology such as an Apple iWatch™, Fitbit® fitness wristband, or other sensor-based component).

The term "transmission medium" is a physical or logical communication path to/from a network device. For instance, the communication path may include wired and/or wireless segments. Examples of wired segments include electrical wiring, optical fiber cable, or any other material to transport electrical signals while wireless segments may include infrared, radio frequency (RF), satellite signaling, or any other wireless signaling mechanism.

The term "computerized" generally represents that corresponding operations are conducted by hardware in combination with software and/or firmware. Also, the "message" may be construed as one or more packets or frames, a command or series of commands, or any collection of bits having the prescribed formatwhile "contemporaneous" means with a short defined period of time before (e.g., less than a few seconds), concurrent with (i.e., at least partially overlapping in time) or within a short defined period of time after a particular event has occurred.

The term "segment" may be construed as a collection of bits. Each segment may feature the same bit (or byte) length or may feature different bit (or byte) lengths (with optional padding), based at least in part, on (i) the original key size and (ii) selected key separation value. For example, for a 256-bit key, in separating the key into two (2) key segments, each key segment would be 128-bits in length. Alternatively, for a 256-bit key, in separating the key into three (3) key segments, two key segment would be 85-bits in length and another key segment may be 86-bits in length. However, it is contemplated that a uniform bit length may be provided with reliance on padding and/or truncating of the key segments at the receiver.

A "cipher" is an encryption scheme that produces encrypted data from data in which a cryptographic key and algorithm are applied to the data. The cipher may include a block cipher that encrypted a series of contiguous bits at once as a group rather than one bit at a time. For example, one type of cipher "Xotic," described in U.S. Pat. No. 8,744,078, the entire contents of which are incorporated by reference. For the description below, however, the Xotic™ cipher may be one of many different types of cryptographic ciphers utilized for secured communications between network devices. As an option, a cipher suite may be available to allow a user (or administrator) to select which of the ciphers (all or some) are permitted for use by the network device. This provides enhanced flexibility and security by allowing an administrator to update, substitute, add, remove or deactivate (i.e., prevent further use of) a cipher from the cipher suite based on customer preferences, compromised ciphers, newly released (and more secure) ciphers, or the like.

Lastly, the terms "or" and "and/or" as used herein are to be interpreted as inclusive or meaning any one or any combination. Therefore, "A, B or C" or "A, B and/or C" may mean any of the following: "A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and is not intended to limit the invention to the specific embodiments shown and described.

II. General Architecture

Referring to FIG. 1, an exemplary embodiment of the general architecture of a key delivery system 100 is shown. Herein, the key delivery system 100 includes a token authority server 110 communicatively coupled to a plurality of relay servers $120_1$-$120_N$, which are deployed as part of a cloud network 130. As shown, the cloud network 130 may include a public cloud network such as Amazon Web Services® (AWS), Microsoft® Azure®, Google® Cloud, or the like. By utilization of a public cloud network, each of the relay servers $120_1$-$120_N$ may be positioned at geographically distant locations to reduce the chances of the key being compromised through an attack directed to one of the relay servers $120_1$-$120_N$. Also, the token authority server 110 may be logic present in the public cloud network 130. Alternatively, the cloud network 130 may be deployed as a virtual private network, provided the token authority server 110 and the relay servers $120_1$-$120_N$ are deployed as part of the virtual private network.

According to one embodiment of the disclosure, the token authority server 110 is configured to issue a token 140 to a first network device 150 (hereinafter, "sending network device 150"), which is configured to initiate a cryptographically secure transmission 160 to a second network device 170 (hereinafter, "receiving network device 170"). It is contemplated that the token authority server 110 may use the OAuth2 standard for access delegation. Before the token authority server 110 issues the token (T1) 140, the sending network device 150 may be configured to send an OAuth2 request to the token authority server 110. The token authority server 110 grants access to the sending network device 150 and/or other known servers in the key exchange network. OAuth2 is used to allow users to access information without providing their credentials (described below), where OAuth2 is used by many companies to allow users to share information with third party applications or websites. Hence, the token authority server 110 grants "secure delegated access" to server resources on behalf of a resource owner, and thus, in working with Hypertext Transfer Protocol (HTTP) communications, OAuth2 allows tokens to be issued to third-party clients by an authorization server with the approval of the resource owner.

Contemporaneously with conducting the secure transmission 160, the sending network device 150 may be configured to logically relate different portions of a cryptographic key (SK) 180, such as a one-time pad (OTP) for example, with the received token 140 to form key value pairs (described below). The cryptographic key (SK) 180 is used to encrypt content within the secure transmission 160. Both the sending network device 150 and the receiving network device 170 are registered devices for subscribers to the key delivery system 100.

As described below, key value pairs may be produced to securely associate the token 140, which may be used as a lookup parameter, with different portions of the cryptographic key (SK) 180 (referred to as "key segment"). In particular, by separating the cryptographic key (SK) 180 into "M" key segments (K1 ... KM) $180_1$-$180_M$ (N≥M≥2) and pairing each of the different key segment $180_1$ ... or $180_M$ with the token (T1) 140, "M" different key value pairs (KVP) $190_1$-$190_M$ may be generated. According to one embodiment of the disclosure, the sending network device 150 is configured to transmit multiple KVPs $190_1$-$190_M$ to different relay servers (e.g., relay servers $120_1$-$120_M$) within the cloud network 130 contemporaneously with the particular transmission 160. The selection of the relay servers $120_1$-$120_M$ may be conducted in accordance with a random or pseudo-random selection process.

Herein, each key segment $180_1$ ... or $180_M$ may be equivalent in length (e.g., equal number of bits or bytes) or may vary in length where some or all of the key segments have different lengths. Also, a "token" includes a plurality of alphanumeric characters of a variable length for use in locating the plurality key segments $180_1$-$180_M$ that collectively form the cryptographic key (SK) 180 being used to encrypt/decrypt content contained within the secure transmission 160 between the sending network device 150 and the receiving network device 170. The secure transmission 160 may be a single message (e.g., an email message, a text (SMS) message, etc.) or may be a series (two or more) of related messages such as a plurality of VoIP messages associated with an on-going communication session. Depending on the type of secure transmission (e.g., video, audio or audio/video transmissions), the token 140 may be relied upon for the transmission 160, where the transmission 160 may be a single message transmission (e.g., an email message transmission) or may be a series of related messages during a communication session where the same token 140 is relied upon until its termination of the communication session or a portion of the communication session has completed. For the later, an additional token would need to be obtained while the communication session remains active.

According to one embodiment of the disclosure, each of the relay servers $120_1$-$120_N$ may be a virtualized server that supports communications with one or more network devices. For example, the relay server $120_1$ may operate as a virtual email server that is part of an email platform offered by the cloud network 130 (e.g., EC2 server nodes for AWS cloud network). As described below and illustrated in FIGS. 6A-6B & 7A-7B, each of the selected relay servers $120_1 \ldots$ and $120_M$ may be configured to (a) receive a KVP $190_1 \ldots$ or $190_M$, each including a corresponding key segment $180_1 \ldots$ or $180_M$ and the token 140, from the sending network device 150 being a subscriber to the key delivery system 100, (b) reposition the KVP $190_1 \ldots$ or $190_M$ to obfuscate their location from the sending network device 150, (c) modify the token 140 within that KVP $190_1, \ldots,$ or $190_M$ to further obfuscate its location from the sending network device 150, and/or (d) return the stored key segment in response to a key segment request message.

Figure 2:
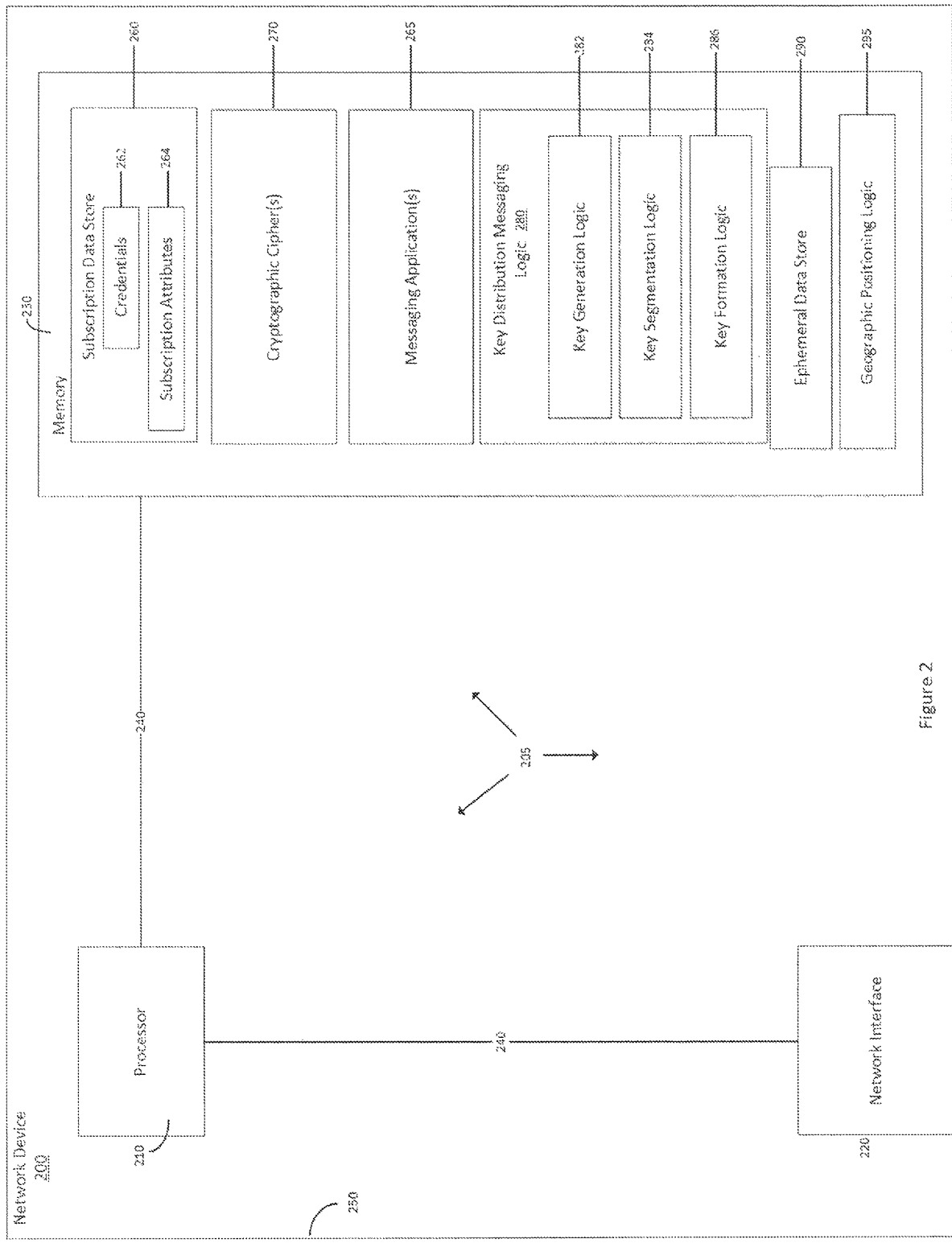
FIG. 2 is an exemplary block diagram of the general architecture of a network device granted access to the key delivery system of FIG. 1.

Referring now to FIG. 2, an exemplary block diagram of the general architecture of a network device 200 granted access to the key delivery system 100 of FIG. 1 (e.g., the sending network device 150 or the receiving network device 170) is shown. Herein, the network device 200 includes a plurality of components 205 including, but not limited or restricted to the following: a processor 210, a network interface 220, and/or a memory 230. The components 205 are communicatively coupled together via a transmission medium 240. As shown, when deployed as a physical device, the components 205 may be at least partially encased in a housing 250 made entirely or partially of a rigid material (e.g., hardened plastic, metal, glass, composite, or any combination thereof) to protect these components 205 from environmental conditions. As a virtual device, however, the network device 200 is directed to the functionality associated with some or all of the logic within the memory 230.

The processor 210 may be implemented as a multi-purpose, programmable component that accepts digital data as input, processes the input data according to stored instructions, and provides results as output. One example of the processor 210 may include a central processing unit (CPU) with a corresponding instruction set architecture. Alternatively, the processor 210 may include a digital signal processor (DSP), an Application Specific Integrated Circuit (ASIC), a field-programmable gate array (FPGA), a microcontroller, or any other electronic circuitry that is configured to support data processing.

As shown in FIG. 2, the processor 210 is communicatively coupled to the memory 230 via the transmission medium 240. According to one embodiment of the disclosure, the memory 230 may be configured to include any combination of the following components: (i) a subscription data store 260; (ii) one or more messaging applications 265; (iii) one or more cryptographic ciphers 270 (e.g., a cryptographic cipher or cipher suite); (iv) key distribution messaging logic 280 including key generation logic 282, key segmentation logic 284, and/or key formation logic 286; (v) an ephemeral data store 290; and/or (vi) geographic positioning logic 295.

Herein, the subscription data store 260 is configured to maintain credentials 262 associated with the network device 200. According to one embodiment of the disclosure, the credentials 262 may include a subscriber identifier that may be requested for submission by the token authority server 110 to confirm that the network device 200 is authorized to use the services provided by the key delivery system 100. As described below, the credentials 262 may be routed to an identity management system to confirm that the network device 200 is associated with an active subscriber to the key delivery system 100 before any token (or tokens) are issued by the token authority server 110 of FIG. 1. Besides the credentials 262, the subscription data store 260 may include attributes 264 assigned to the network device 200 and its users. Alternatively, OAuth2 communications may be utilized in lieu of the submission of credential 262.

Herein, the subscription attributes 264 may include performance-based attributes, administrative-based attributes, and/or subscriber-configured attributes. The performance-based attributes may be used to adjust the operability and/or strength (resiliency) of a selected cryptographic cipher of the stored cryptographic cipher(s) 270 for transmissions governed by a selected messaging application of the stored messaging application(s) 265. For example, the performance-based attributes may specify (a) key length setting, and/or (b) a key separation value (M) representing the number of segmentations performed on the cryptographic key (SK) 180 prior to uploading "M" key segments to relay servers in the cloud network.

In contrast, the administrative-based attributes may be used to control "back office" operability of the key delivery system 100. Examples of administrative-based attributes may include a subscription identifier that may be included as part of a token request message (see FIGS. 3, 6A) to identify the subscription level or a contracted pricing to be charged for issuance of a token. The administrative-based attributes may further include automated alert notification parameters to adjust intended recipient(s) for certain types of alerts, such as notifying a subscriber that a charge has been made to a designated credit or debit card to replenish a pre-paid account. Another type of alert may be identifying that a change in cryptographic ciphers and/or key length and notifying the subscriber of the change based, at least in part, on a current geographic location of the network device 200 as the sender and/or a location of a receiver (e.g., by IP address, etc.) a determined by the geographic positioning logic 295 for compliance with cryptography regulations of a particular region, state, or country.

The subscriber-configured attributes may be used by a subscriber to customize its subscription by providing certain permissions and/or imposing certain restrictions directed to message encryption. For instance, certain targeted destinations may be selected to use specific cryptographic ciphers of the stored cryptographic ciphers 270 (and specific key lengths) to enhance security directed to those destinations. For instance, transmissions directed to certain governmental agencies (e.g., Department of Defense, Department of Justice, etc.) may require more heightened security than other message destinations (e.g., particular approved cipher, set minimal key length, etc.). Similar attributes may be used to reduce security. Hence, the subscriber-configured attributes may provide centralized control of cipher and/or key length selection to ensure compliance with security requirements that may vary among different vendors, suppliers, and customers.

The cryptographic cipher(s) 270 correspond to one or more ciphers for use in encrypting content within a particular transmission and recovering the content in non-encrypted format. The cryptographic cipher(s) 270 may include a single cryptographic cipher or a cipher suite including multiple ciphers that provides flexibility in the use of certain ciphers based on subscriber preference, customer preference, or geographic regulations. The geographic positioning logic 295 is configured to detect a geographic location of the network device and potentially cause a change in the cryptographic cipher 270 as necessary.

The key distribution messaging logic 280 includes key generation logic 282, key segmentation logic 284 and key formation logic 286. For key delivery, the key generation logic 282 is configured to generate the cryptographic key (SK) 180. One of the cryptographic cipher(s) 270 may use the cryptographic key (SK) 180 to encrypt content being output from the network device 200 for transmission over a network. Also, the key segmentation logic 284, based on the key separation value (M) being a subscription attribute, controls the formation of "M" KVPs $190_1$-$190_M$. More specifically, the key segmentation logic 284 may initiate a token request message to obtain a token (e.g., token T1 140) for temporary storage in ephemeral data store 290 and use in key delivery to another network device. Additionally, the key segmentation logic 284 is configured to separate the cryptographic key (SK) 180, which is stored in ephemeral memory operating as the ephemeral data store 290, into "M" key segments $180_1$-$180_M$ according to the above-described key separation value. Therefore, the key segmentation logic 284 is configured to generate the KVPs $190_1$-$190_M$ by pairing each of the respective key segments $180_1$-$180_M$ with the received token (T1) 140.

For key recovery, when the network device 200 is operating to decrypt incoming, encrypted content within a message from another subscriber network device, the key formation logic 286 controls token retrieval from the token authority server 110 of FIG. 1. Based on the retrieved token, the key formation logic 286 receives key segments associated with the retrieved token to recover a cryptographic key (SK), which may be subsequently stored in the ephemeral data store 290 for decryption operations.

Figure 3:
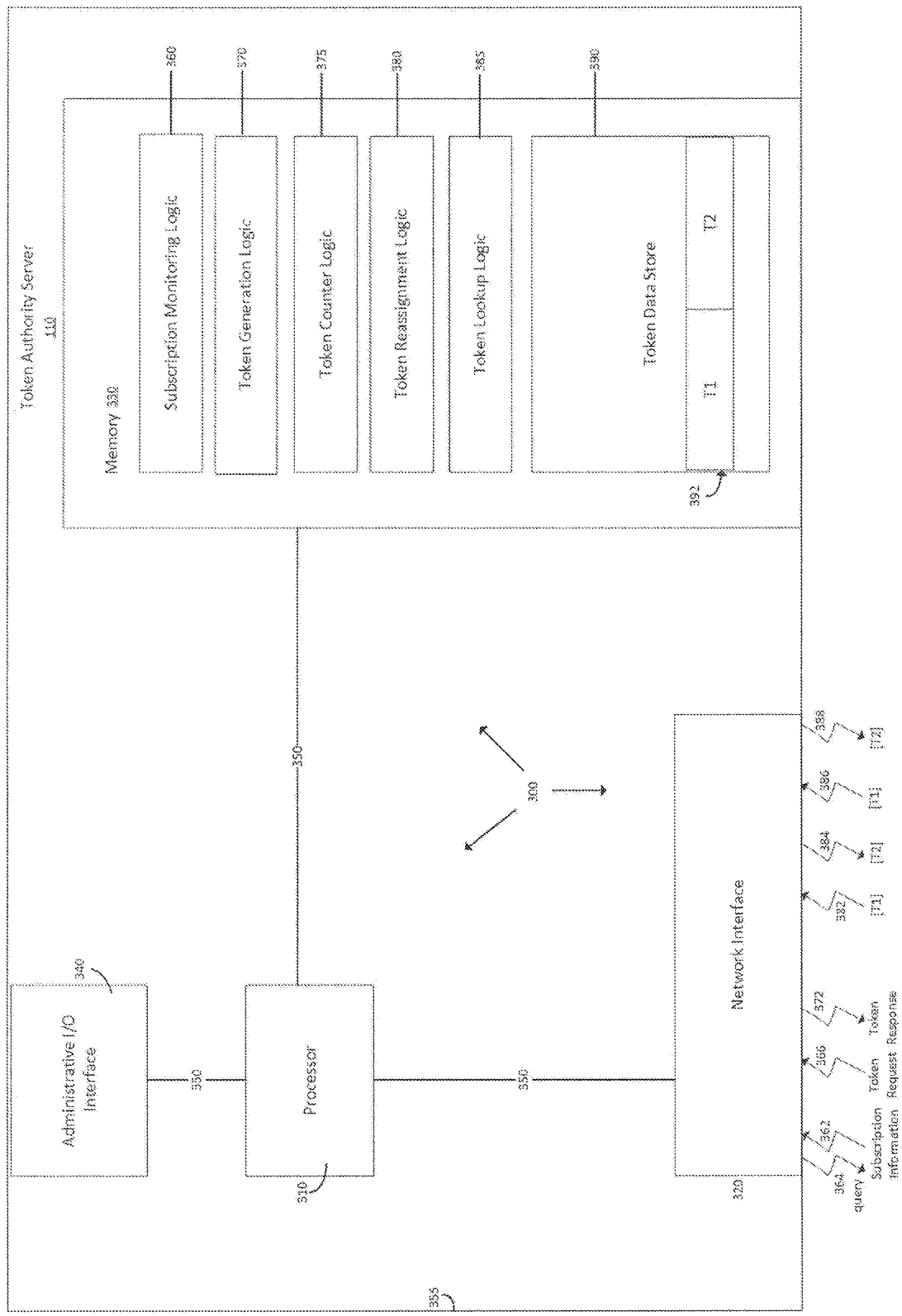
FIG. 3 is an exemplary block diagram of the general architecture of a token authority server deployed within the key delivery system of FIG. 1.

Referring to FIG. 3, an exemplary block diagram of the general architecture of the token authority server 110 deployed within the key delivery system 100 of FIG. 1 is shown. Herein, the token authority server 110 includes a plurality of components 300 that may include, but are not limited or restricted to a processor 310, a network interface 320, a memory 330, and/or an administrative (I/O) interface 340 being an interface for downloaded updates (e.g., software updates for logic stored in memory 330) and uploaded accounting information (e.g., token counts per subscriber, network device, etc.). The components 300 are communicatively coupled together via a transmission medium 350. As shown, when the token authority server 110 is deployed as a physical device, the components 300 may be at least partially encased in a housing 355. However, as a virtual device, the token authority server 110 is directed to the functionality associated with some or all of the logic within the memory 330.

The processor 310 is a multi-purpose, programmable component that accepts digital data as input, processes the input data according to stored instructions, and provides results as output, as described above. The network interface 320 supports connectivity with an identity management system 530 of FIG. 5, as described below. Communicatively coupled to the processor 310, the memory 330 may be configured to include (i) a subscription monitoring logic 360; (ii) token generation logic 370; (iii) token counter logic 375; (iv) token reassignment logic 380; (v) token lookup logic 385, and (vi) token data store 390.

Herein, the subscription monitoring logic 360 is configured to assist in the conformation that a network device requesting a token from the token authority server 110 is associated with a subscriber to the key delivery system 100 of FIG. 1. For this embodiment of the disclosure, the subscription monitoring logic 360 is configured to receive and forward subscription information 362 (e.g., credential, etc.) from a particular network device (e.g., sending network device 150 of FIG. 1) for use in authenticating the particular network device (e.g., verifying an active subscription is currently held by a subscriber associated with the particular network device). The upload of the subscription information 362 may be conducted in accordance with either a "push" or "pull" data acquisition sequence. For a "push" data acquisition sequence, the token authority server 110 receives the subscription information 362 without any prompting. For a "pull" data acquisition sequence, the subscription information 362 may be received in response to a query message 364 being issued by the token authority server 110. The query message 364 may be issued based on receipt of a token request message 366 and a determination that an active subscription for the particular network device has not been established for over a prescribed period of time (e.g., day, week, etc.). Alternatively, the query message 364 may be issued as a scheduled multicast or broadcast message.

In response to receipt of the token request message 366 from the sending network device 150 of FIG. 1, provided the particular network device has been authenticated, the token generation logic 370 generates a token 372 for return to the sending network device 150. According to one embodiment of the disclosure, the returned token 372 may be unique to the key delivery system 100. However, according to another embodiment of the disclosure, the token 372 may be unique to a set of tokens stored within the token data store 390 that are currently in use. After issuance, the token counter logic 375 maintains and increases a count value associated with a subscriber requesting the token, where the count value may be subsequently upload via the administrative interface 340 to the identity management system 530 of FIG. 5 for billing of the subscriber via debiting a pre-paid account for the subscriber. The subscriber identifier may be included as part of the token request message 366.

The token reassignment logic 380 is configured to operate in response to a token change request message from one of the relay servers. Upon receipt of the token change request message 382, including the original token (T1), the token reassignment logic 380 generates a second token (T2), which is associated with the original token (T1) and stored as a corresponding token pair in an entry within a data structure (e.g., database, listed list, etc.) of the token data store 390. The token reassignment logic 380 causes return of the second token (T2) via a token change response message 384.

The token lookup logic 385 is configured to operate in response to a token request message from a receiving network device. In response to the token lookup message 386 including the original token (T1), the token lookup logic 385 accesses one or more of entries within the token data store 390 using the original token (T1) as a lookup. The token lookup logic 385 generates a token lookup reply message 388 including the second token (T2) based on extraction of the second token (T2) from an entry 392 within a data structure within the token data store 390 including the original token (T1) and second token (T2) combination. Thereafter, the token lookup logic 385 may initiate deletion of entry 392 within the token data store 390.

III. Registration and Subscription Verification

Figure 4:
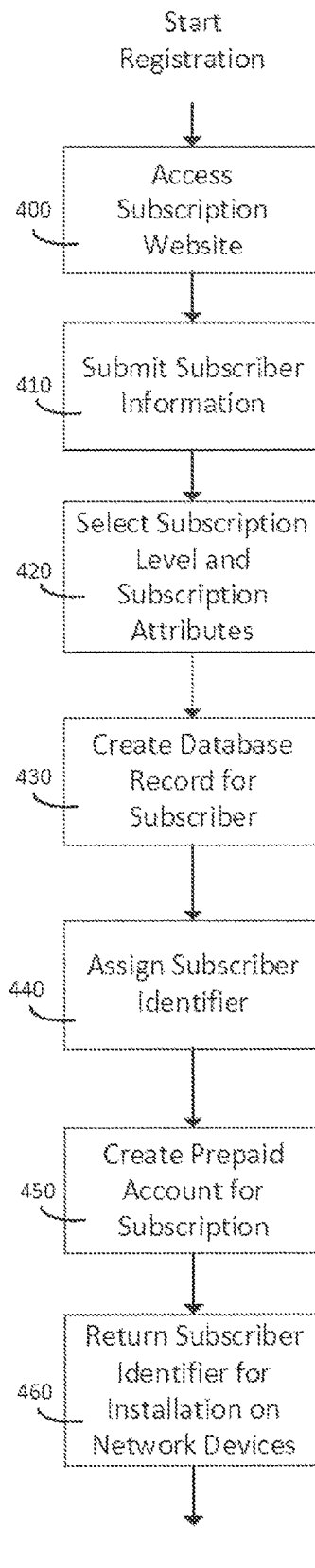
FIG. 4 is an exemplary flowchart of a registration process conducted by the network device of FIG. 2 to subscribe to services provided by the key delivery system of FIG. 1.

Referring now to FIG. 4, an exemplary flowchart of a registration process conducted by the network device 200 of FIG. 2 in subscribing to services provided by the key delivery system 100 of FIG. 1 is shown. Herein, the network device accesses a website through a portal to enable a potential subscriber to join the key delivery system (operation 400). In particular, via one or more webpages accessible through the portal, the potential subscriber is able to supply an identity management system 530 of FIG. 5, operating in conjunction with the key delivery system 100, with information associated with the potential subscriber such as contact and billing information, credit or debit card information for establishing a pre-paid account balance where costs for each token issuance is applied to the balance and the balance may be replenished using the credit or debit card information (operation 410).

Additionally, the potential subscriber may select a subscription level and, as an optional feature, particular subscription attributes using conventional on-line interactive techniques (operation 420). The subscription attributes may include certain performance-based attributes, administrative-based attributes, and/or subscriber-configured attributes, as described above. Thereafter, a database record is created for that subscriber (operation 430), wherein an identifier is assigned to the subscriber (operation 440). Additionally, a pre-paid account balance (e.g., a prescribed monetary value that may vary depending on expected usage by the subscriber) is created using the credit/debit card information provided by the subscriber with an automated replenish once the account falls below a monetary threshold (operation 450).

Hence, the subscription is complete and the subscriber identifier is returned to the subscriber for manual or automated installation into each of network devices associated with the subscriber as part of its credentials (operation 460). The selected installation scheme may be chosen from a number of conventional data updating techniques.

Figure 5:
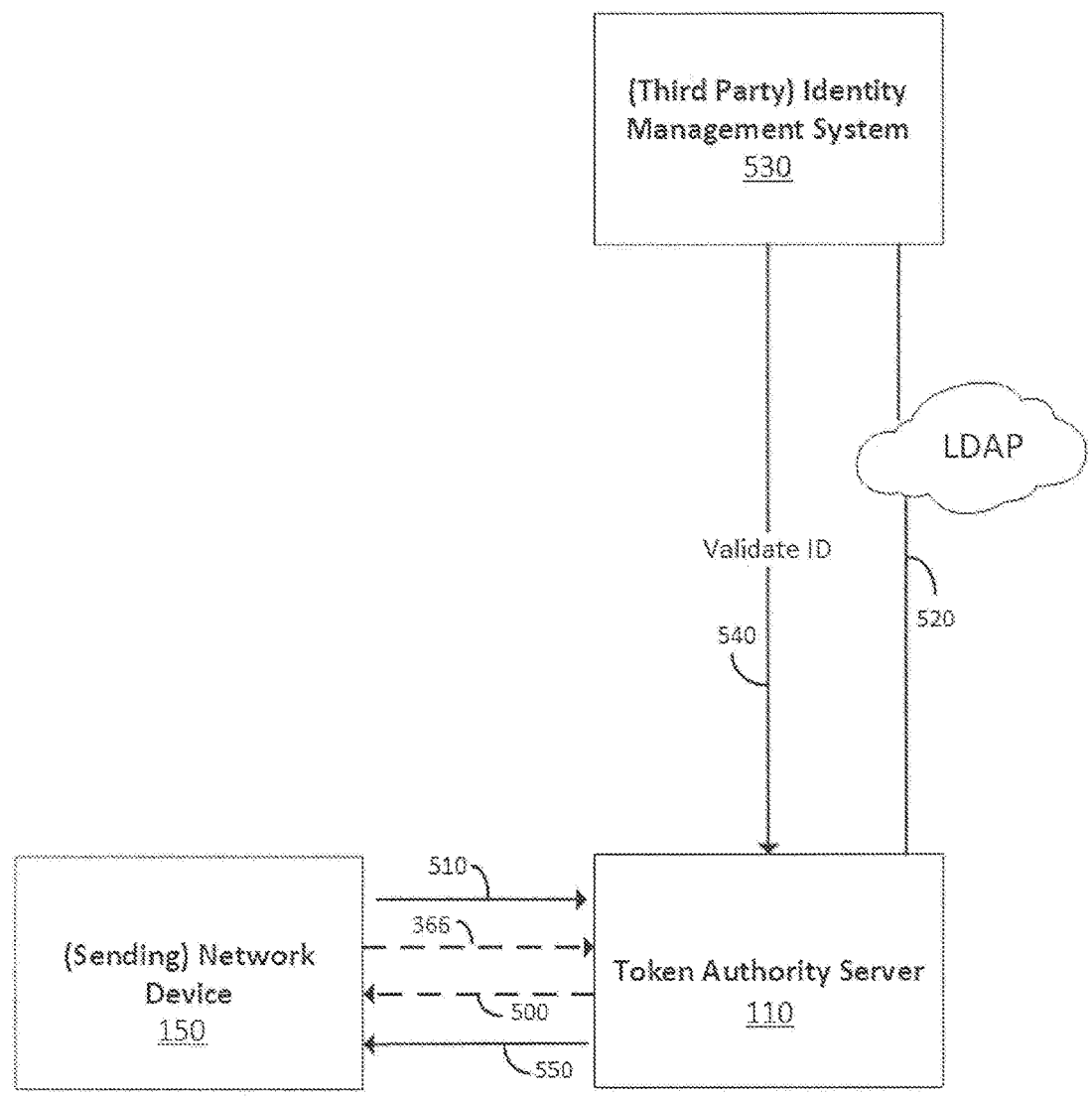
FIG. 5 is an exemplary block diagram of the token authority server of FIG. 3 for token request validation and subscription consolidation.

Referring now to FIG. 5, an exemplary block diagram of the operability of the token authority server 110 of FIG. 3 for subscription validation in response to issuance of a token request message is shown. More specifically, in response to a token request message 366, prior to issuing a token to the sending network device 150 to secure its communications with another network device, the token authority server 110 may determine whether the user associated with the network device 150 has an active subscription to the key delivery system 100. According to one embodiment of the disclosure, this determination may be conducted by the token authority server 110 initiating a subscription query message 500 of the network device 150. This subscription query message 500 may be conducted on a first request for a token or a request conducted after a prescribed period of time has elapsed from a previous request for a token. However, it is contemplated that the network device 150 may be configured to supply its stored subscription information to the token authority server 110 without any prompting by the token authority server 110 such as the subscription query message 500. Namely, the subscription information (credentials 262) is provided via a "push" communication rather than a "pull" communication.

In response to the subscription query message 500, the sending network device 150 may be configured to convey its stored subscription information via a subscription reply message 510. For example, the stored subscription information may include credentials 262, including a subscriber identifier that identifies a subscriber associated with the network device. As shown, the token authority server 110 initiates a Lightweight Directory Access Protocol (LDAP) communication session 520 with the identity management system 530. During the LDAP session, the token authority server 110 uploads the subscriber identifier received from the network device to the identity management system 530. Additionally, the token authority server 110 may provide information that identifies the sending network device 150, which may be information that is part of the subscriber identifier or information separate from the subscriber identifier (e.g., IP address, MAC address, manufacturer ID, etc.).

Upon authenticating the subscriber identifier provided from the network device 150 and confirming that the subscription is active, the identity management system 530 returns data 540 confirming that the subscriber identifier is valid and the subscription is active. Thereafter, the token authority server 110 may issue the token (T1) if the subscription reply message 510 is responsive to a prior token request message 366. Where the subscription validation is independent of the token request message 366, the token authority server 110 may return an authentication message 550, including a portion of the data 540, to the network device 150 to represent that the server 110 is ready to response to token request messages.

Additionally, upon receipt of the data 540 confirming that the subscriber identifier is valid and the subscription is active, it is contemplated that the token authority server 110 may reset the count associated with the subscriber identified by the subscriber identifier, which represents the number of tokens issued for that subscriber. The count may be uploaded to the identity management system 530 at a prescribed time (e.g., at a scheduled time such as midnight every night, every hour, etc.) to debit the subscriber's account for the costs associated with the token issuances over a predetermined time period from the count reset to upload. After each upload, the identity management system 530 may require the subscriber to re-authenticate.

Where the network device 150 is not authenticated by the identity management system 530, based on an invalid subscriber identifier or an inactive subscription, the data 540 returned by the identity management system 530 may identify that the subscriber identifier has not been authenticated or the subscription is not active. This may cause the token authority server 110 to alter the authentication message 550 to identify that no tokens will be provided currently. The authentication message 550 may cause an image to be displayed by the network device, where the user of the network device 150 may be able to select a link to connect to the user to an administrative service to rectify the situation, if desired by the user.

Alternatively, access delegation of the sending network device 150 may be conducted through the OAuth2 standard. Herein, the sending network device 150 may be configured to send an OAuth2 request to the token authority server 110. The token authority server 110 grants access to the sending network device 150 and/or other known servers in the key exchange network. OAuth2 is used to allow users to access information without providing their credentials 262, where the token authority server 110 grants "secure delegated access" to server resources on behalf of a resource owner, and thus, allows tokens to be issued to third-party clients by an authorization server with the approval of the resource owner.

IV. Key Delivery System Operations

Figure 6A:
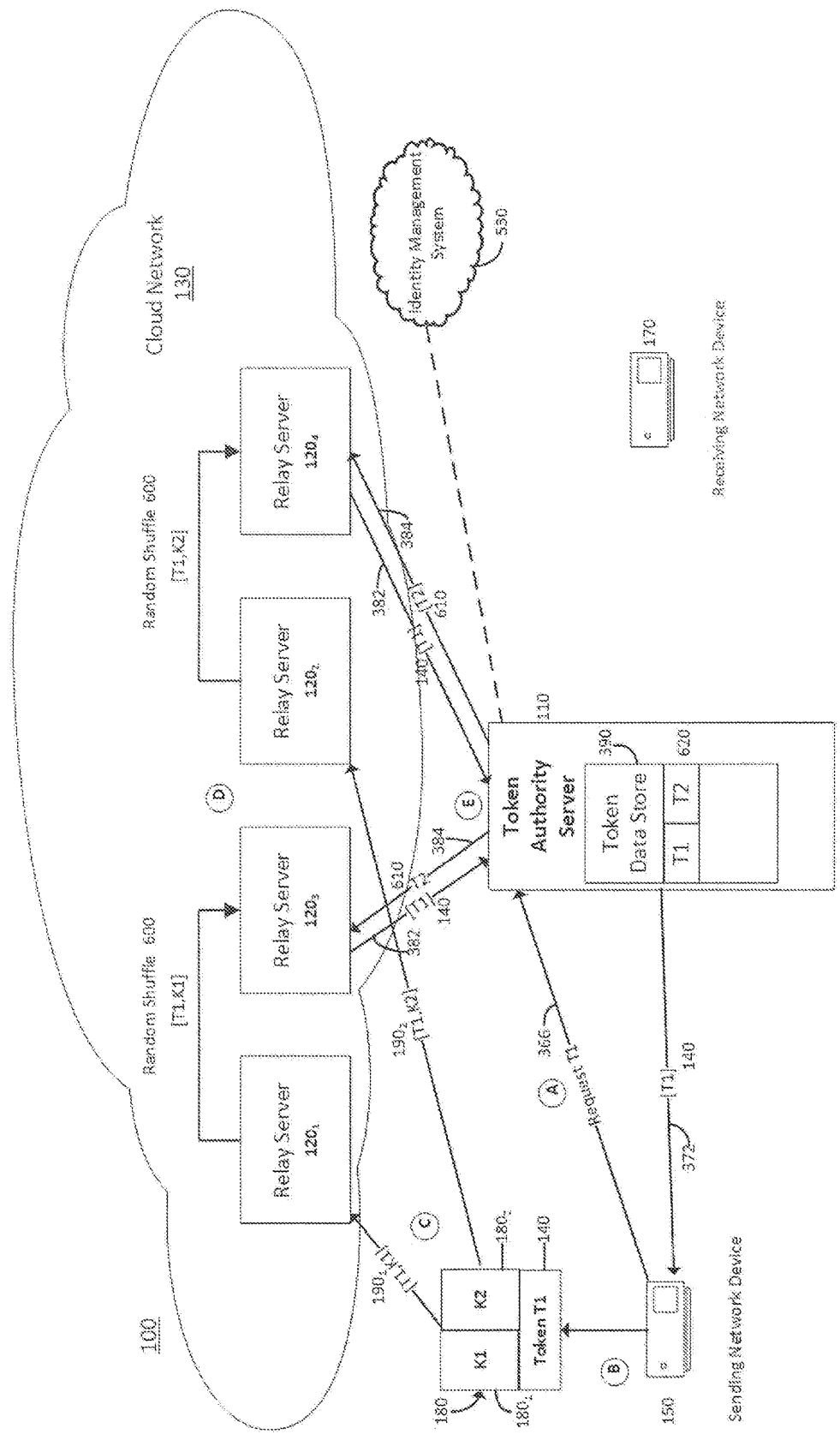
FIG. 6A is an illustrative block diagram illustrating a first set of operations conducted by the key delivery system in relocating portions of a cryptographic key from a sending network device and token reassignment by the token authority server.

Referring to FIG. 6A, an illustrative block diagram illustrating a first set of operations conducted by the key delivery system 100 in relocating segments of a cryptographic key 180 from the sending network device 150 and token reassignment by the token authority server 110 is shown. Herein, the key delivery system 100 features a double-blind configuration in which the receiving network device 170 possesses no personal information associated with the sending network device 150.

According to this embodiment of the disclosure, in order to emit a secure transmission, the sending network device 150 issues the token request message 366 to the token authority server 110. In response to the sending network device 150 being associated with a subscriber to the key delivery system 100 based on communications with the identity management system 530, the token authority server 110 returns the token (T1) 140 via the token response message 372 (see operation A). Upon receipt of the token (T1) 140, the sending network device 150 generates the cryptographic key 180 (e.g., OTP), which is separated into "M" key segments. For this embodiment, the cryptographic key 180 is separated into a first key segment $180_1$ and a second key segment $180_2$, although other degrees of separation (M>2) may be selected (see operation). Herein, each key segment $180_1$ and $180_2$ is of equivalent length (i.e., same number of bits or bytes), although the lengths may be variable in which the key segment $180_1$ and $180_2$ would could have different lengths.

Each separate key segment, namely the first key segment (K1) $180_1$ or the second key segment (K2) $180_2$, along with the assigned token (T1) 140, form key value pairs (KVPs) $190_1$ and $190_2$. As shown, the first KVP $190_1$ is transmitted to the first relay server $120_1$ and the second KVP $190_2$ is transmitted to the second relay server $120_2$ (see operation C) The relay servers $120_1$ and $120_2$ are positioned at different geographic regions within the cloud network 130. For this embodiment, where the cloud network 130 is a public cloud network, such as the AWS network for example, the relay servers $120_1$ and $120_2$ may correspond, at least in part, to EC2 server nodes.

As further shown in FIG. 6A, the relay servers $120_1$ and $120_2$ are adapted to perform random (or pseudo-random) shuffling operations 600 with retry capability to transfer the KVP $190_1$ and $190_2$ to different relay servers $120_3$ and $120_4$, respectively (see operation D). The shuffling obfuscates the location of at least the key segments (K1, K2) $180_1$ and $180_2$ from the sending network device 150. Now, each of the KVP $190_1$ or $190_2$ is assigned to a new, but different, relay server (hereinafter, "reassigned relay servers" $120_3$ or $120_4$). In the event that a relay server (e.g., relay server $120_2$) attempted to send its KVP $190_2$ to a reassigned relay server that already includes the key segment $180_1$ (e.g., reassigned relay server $120_3$), the reassigned relay server $120_3$ would have responded to the attempted shuffle by requesting the relay server $120_2$ to retry sending the KVP $190_2$ to another relay server (e.g., reassigned relay servers $120_4$).

Figure 6B:
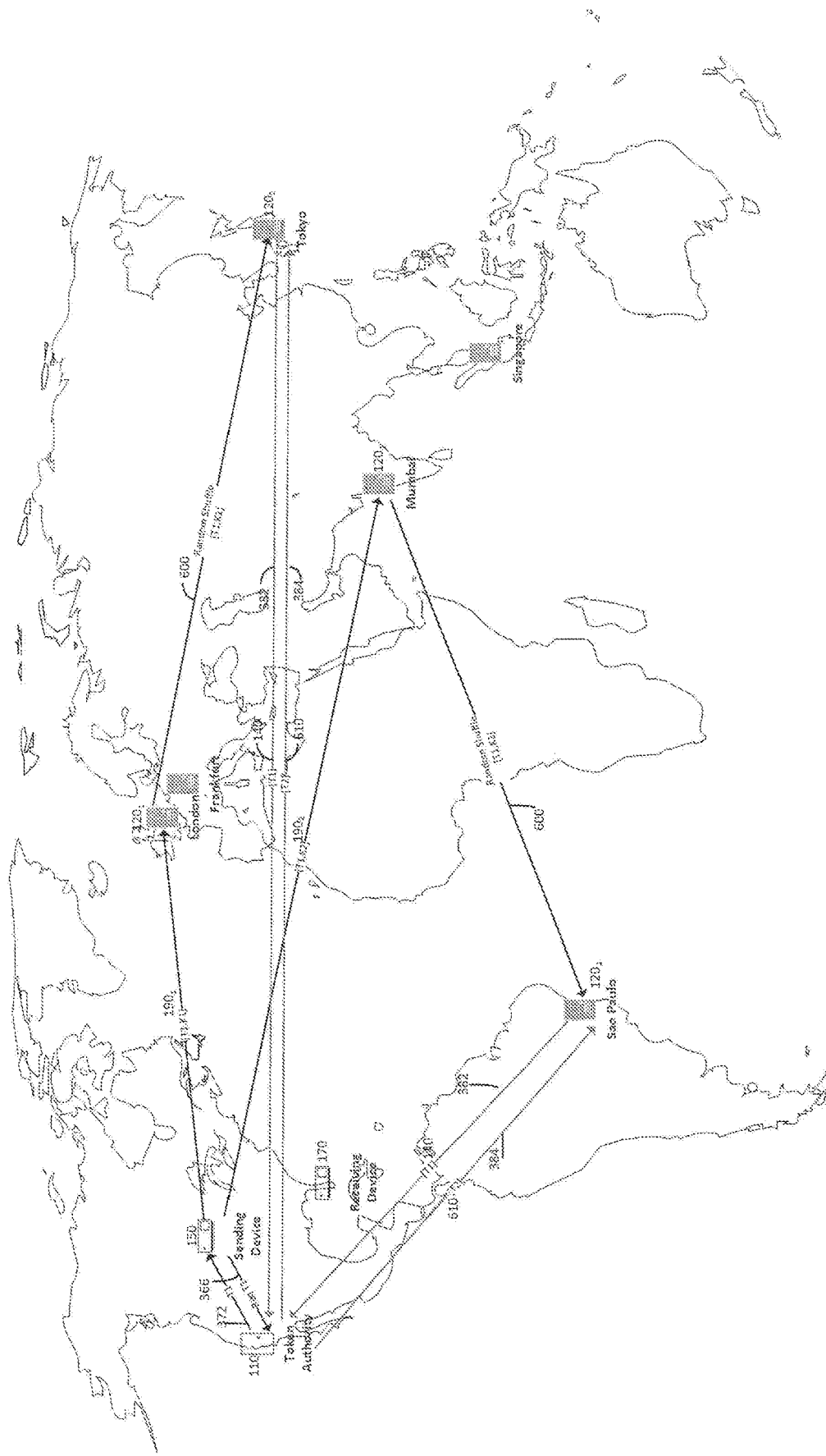
FIG. 6B is an illustrative block diagram of the first set of operations conducted by the key delivery system as shown in FIG. 6A from a geographic perspective.

After completion of the reshuffling of the KVPs $190_1$-$190_2$, each reassigned relay servers $120_3$ and $120_4$ establishes communications with the token authority server 110 and issues the token change request message 382 to the token authority server 110. Each token change request message 382 includes the token (T1) and an address for its originating reassigned relay server $120_3$ and $120_4$. Upon receipt of each of the incoming token change request messages 382, the token authority server 110 generates a second token (T2) 610 corresponding to the token (T1) 140, and return the second token (T2) to the relay servers $120_3$ or $120_4$ via corresponding token change response messages 384 (see operation E). The token authority server 110 further stores a correspondence between the token (T1) 140 and the second token (T2) 610 within an entry 620 of the token data store 390. A geographic representation of the operations described in FIG. 6A is shown in FIG. 6B.

Figure 7A:
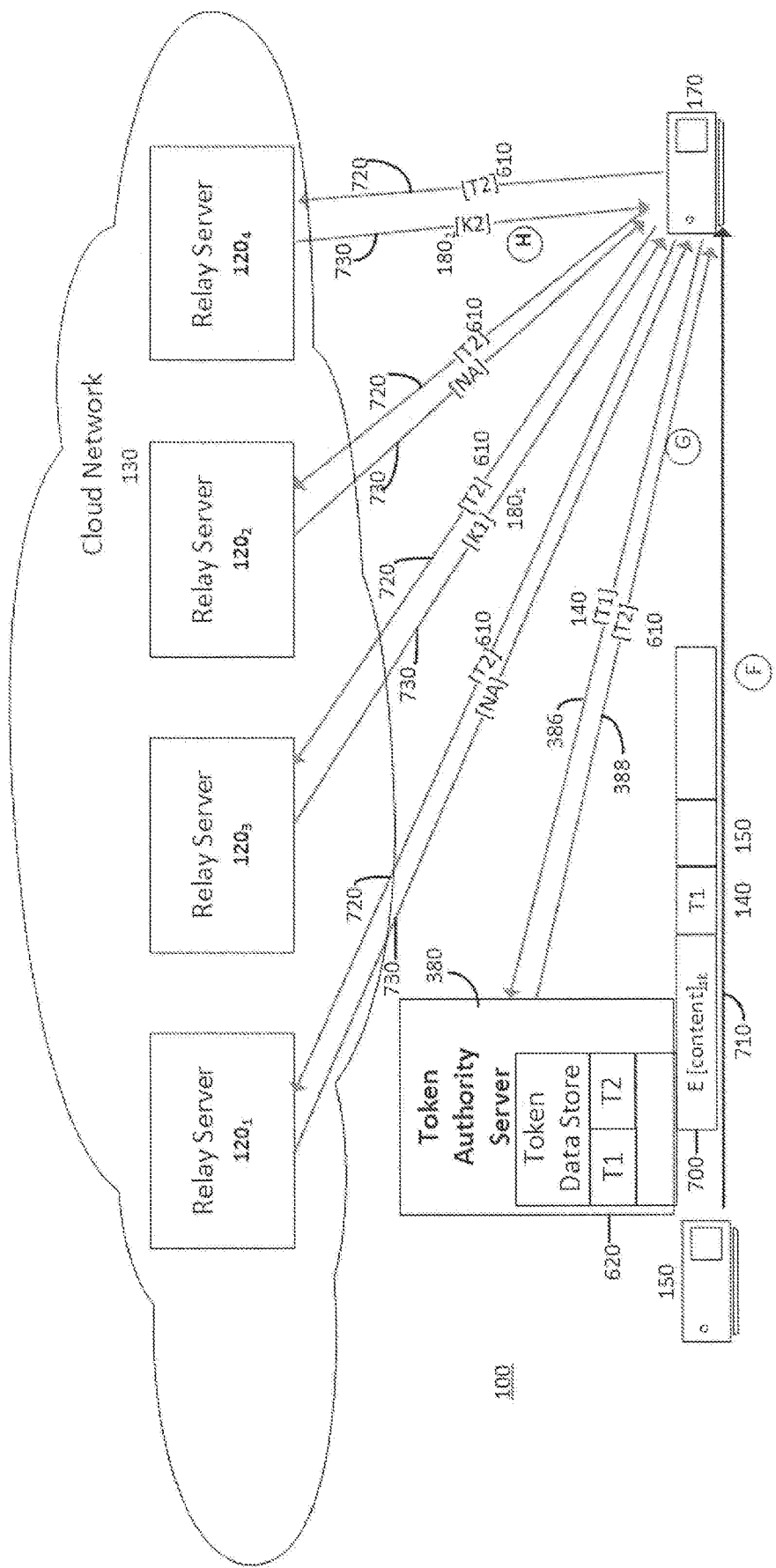
FIG. 7A is an illustrative block diagram illustrating a second set of operations conducted by the key delivery system in securely transferring the portions of the cryptographic key to a receiving network device.
Figure 7B:
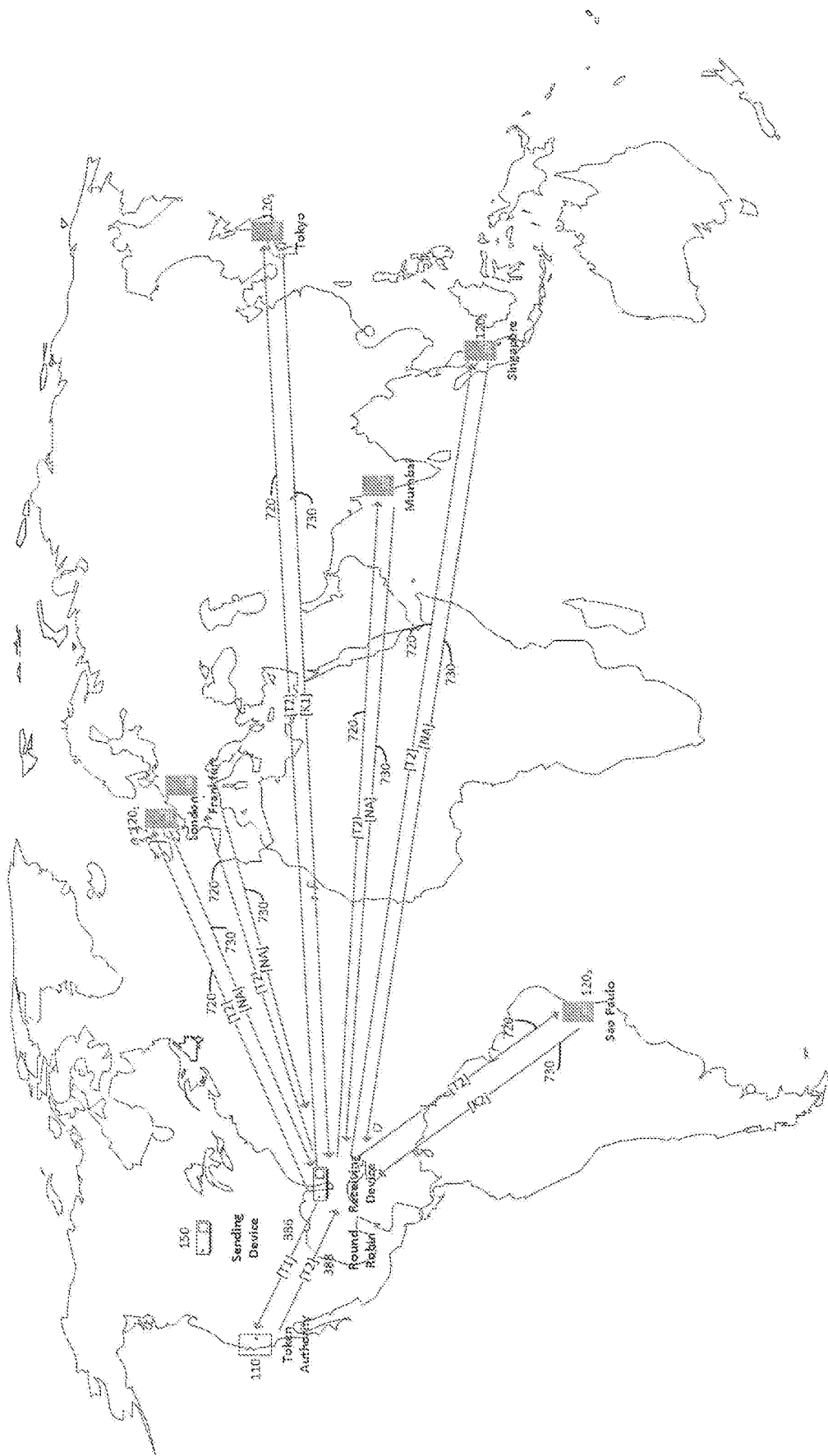
FIG. 7B is an illustrative block diagram of the second set of operations conducted by the key delivery system as shown in FIG. 7A from a geographic perspective.

Referring to FIG. 7A, an illustrative block diagram illustrating a second set of operations conducted by the key delivery system 100 in securely transferring the portions of the cryptographic key to the receiving network device 170 is shown. A geographic representation of the second set of operations (described below) is illustrated in FIG. 7B.

Herein, the sending network device 150 transmits an encrypted message 700 to the receiving network device 170. The encrypted message 700 includes a network address of the sending network device 150, the token (T1) 140 and content 710 encrypted with the cryptographic key (SK) 180 (see operation F). Upon receipt of the encrypted message 700 including the token (T1) 140, the receiving network device 170 communicates with the token authority server 110 by transmitting the token lookup message 386 including the token (T1) 140 to the token authority server 110. The token authority server 110 accesses its token data store 390, and upon determining a presence of the token (T1) 140 within its entry 620, the token authority server 110 return the second token (T2) 610, which corresponds to the token (T1) 140, to the receiving network device 170 via the token lookup reply message 388 (see operation G).

More specifically, the token authority server 110 receives the token (T1) 140 and uses the token (T1) 140 as a lookup to access the second token (T2) 610 from the token data store 390. Upon confirmed receipt of the token lookup response message 388 by the receiving network device 170, the token authority server 110 may be configured to delete contents of the entry 620 associated with tokens T1/T2 or tag this entry to be overwritten.

Upon receipt of the second token (T2) 610, the receiving network device 170 generates a key segment request message 720 (as shown), as separate unicast messages or as a multicast message, to each of the relay servers $120_1$-$120_4$. The key segment request message(s) 720 include the second token (T2) 610 and prompt the relay servers $120_1$-$120_4$ to return any key segment corresponding to the second token (T2) 610 via key segment response message(s) 730 or nothing as represented by the "NA" label (see operation G). Of course, the relay servers $120_1$-$120_4$ may be configured to return a key segment response message 730 only upon detection content associated with second token (T2) 610.

Upon receipt of the first key segment (K1) $180_1$ and the second key segment (K2) $180_2$ from at least two different relay servers located at different locations within the cloud network (e.g., relay servers $120_3$ and $120_4$), the receiving network device 170 may recover the cryptographic key (SK) for decrypting the encrypted content 710.

V. Alternative Embodiments

Figure 8:
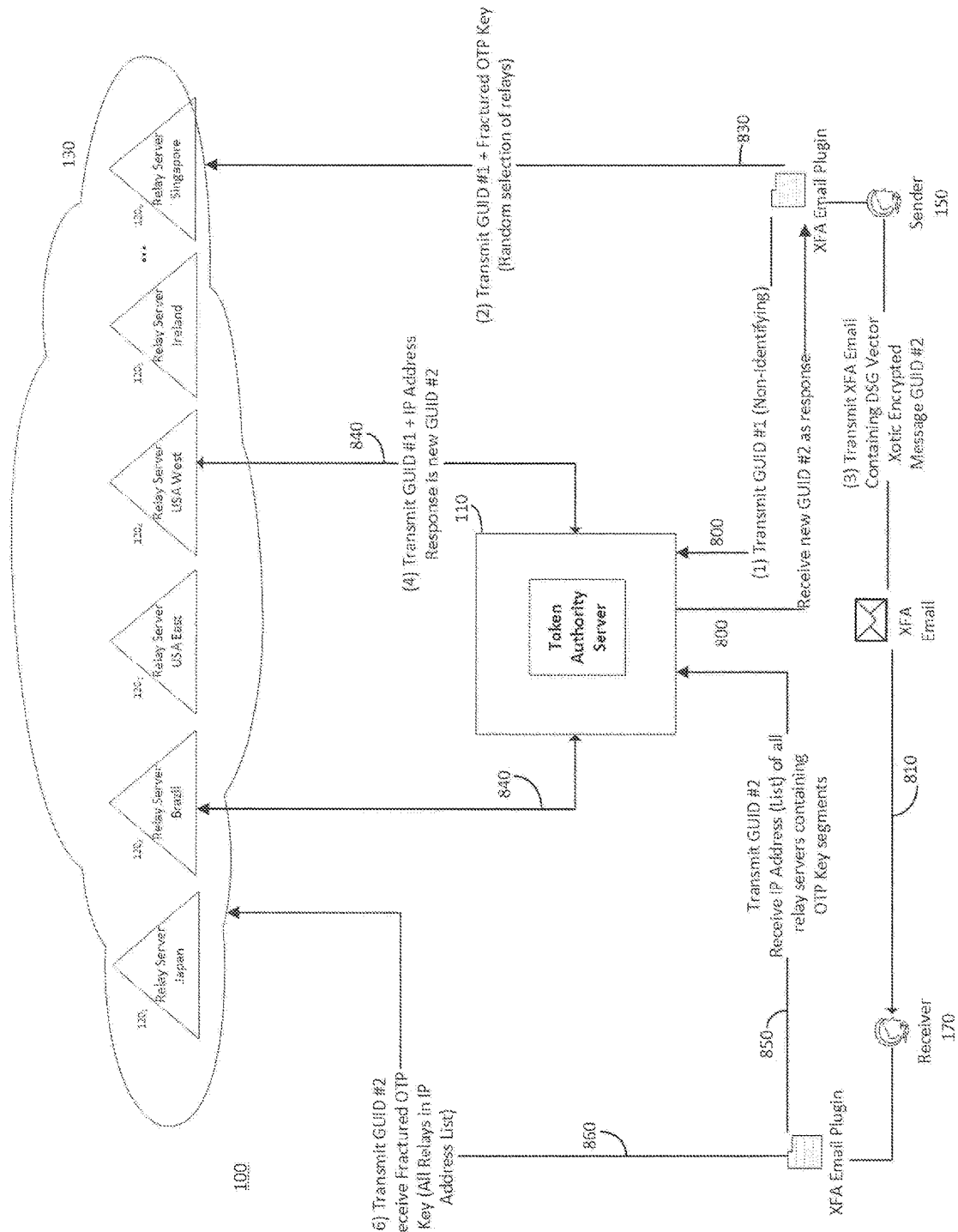
FIG. 8 is an illustrative general overview diagram that illustrates a logical depiction of the various system actors and lines of communication by and between the components that are required to send an XML Forms Architecture (XFA) encrypted email.

Referring to FIG. 8, an illustrative block diagram that illustrates a logical depiction of various operations performed by components deployed as an embodiment of the key delivery system 100 is shown. Herein, the key delivery system 100 is based on an implementation of a cryptographic cipher, such as the Xotic™ cipher described above, installed into each of the network devices 150, 170 to support an exchange of encrypted email messages. For this embodiment, the cryptographic cipher (e.g., Xotic™ cipher) and cipher (e.g., Xotic™) encrypted file-attachment(s) (XFA) are implemented in the current revision of the Java Runtime Environment (JRE) that is running on the network devices subscribed to the key delivery system 100.

To protect and secure email messages, an email plug-in with the XFA functionality is installed in both the sending network device (sender) 150 and receiving network device (receiver) 170. For reference implementation, Google® Gmail™ and Google® API client libraries written to Java language specification comprise the plug-in and email exchange mechanism. That is to say, Xotic™/XFA (created as a Google® plug-in) shall be made available to and installed within the email accounts of both sending and receiving parties.

The key delivery system 100 may be based on a publicly accessible application server infrastructure, although a semi-closed for fully-closed system may be used to implement this invention in a proprietary, limited, or exclusive way. For broad public exposure, however, the key delivery system 100 utilizes Amazon® Web Services (AWS) cloud network 130, and more specifically the use of Elastic Compute Cloud (EC2) server nodes in a distributed set of geographic locations, which are configured to operate as relay servers $120_1$-$120_N$.

More specifically, the compute-server deployment for the key delivery system 100 may include a plurality of anonymous "relay" servers $120_1$-$120_N$ as well as one or more trusted "token authority" servers 110. Geographic locations for the relay servers $120_1$-$120_N$ include multiple (e.g., three) designated EC2 servers in each of the 15 world-wide locations offered by AWS, for a total of 45 relay servers. Other additional EC2 servers (e.g., three EC2 servers) may be configured to operate as token authority servers. Individual token authority servers may be positioned in various geographical regions such as in US-West Oregon-1, US-East Virginia-3, and Asia Pacific (Singapore), respectively.

The operating system environment on each of the forty-eight (48) AWS servers $120_1$-$120_N$ are open-source Linux-based CENT-OS. With a minimal compute requirement, servers in the reference implementation are established as T2 Micro "Free Tier", with one virtual processor (vCPU) and 1 gigabyte (GB) of random access memory (RAM). The AWS servers further include the latest JRE install as well as the most current Apache2 open-source Tomcat Application server. It should be noted that Tomcat Application servers utilize open-SSL and (once running) maintain firewall restrictions, only allowing traffic to ingress on port 443.

A custom Java Servlet (API) is deployed to each of the AWS relay servers $120_1$-$120_N$ allowing them to behave like a relay in accordance with the invention. At a minimum, reference implementation relays support two (2) public-facing API functions, including "store( )" and "lookup( )". API functions are implemented as JSON-based web services whereby a request message (e.g., parameterized HTTP GET message) can invoke either command, and a well-formatted JSON response is returned. Similar to relay servers $120_1$-$120_N$, the token authority server 110 follow the same API implementation specifications of HTTP GET request and JSON response. Token authority server expose "register( )", "notify( )", and "recover( )" functions.

Further, both sender and receiver are required to utilize Xotic™ technology on both ends of the transmission. The version of Xotic™ that sender and receiver are using may differ.

In another embodiment, a transmission begins when a randomly (or pseudo-randomly) generated token, such as a globally unique identifier "GUID" for example (hereinafter, "GUID #1") is transmitted (e.g., broadcast) to the token authority server 110 by the sender 150 (operation 800). The transmitting of GUID #1 is conducted to inform the token authority server 110 that an Xotic™ encrypted file-attachment (XFA) message was transmitted to another network device such as receiver 170 (operation 810). The GUID is non-identifying and has only the scope of the individual message to be encrypted.

Further, there may be multiple token authority servers known to both the sender 150 and the receiver 170. Further, the sender 150 randomly (or pseudo-randomly) selects from a list of known token authority servers, inclusive of the token authority server 110, for this transmission. Still further, the identity of the specific token authority server 110 that the sender 150 utilized (informed) of the XFA transmission is contained in the header of the Xotic™ encryption message that is transmitted to the receiver 170. Still further, the token authority server 110 generates a new token (e.g., a GUID identified by "GUID #2") and, different than the embodiment described in FIGS. 6A-6B, the GUID #2 may be provided as part of a response message back to the sender 150 (operation 820). Both GUID #1 and GUID #2 are temporarily maintained in the ephemeral memory of the designated token authority server 110. Further, according to one embodiment of the disclosure, the transmission of the GUID #1 from the sender 150 to the token authority server 110 and subsequent response of the GUID #2 may utilize traditional PKI encryption methods.

In another embodiment, simultaneous to the transmission of the XFA message by the sender 150 to the token authority server 110, the cryptographic key (SK) 180 is separated (e.g., fractured) by the sender 150 and transmit (e.g., broadcast) in segments to a random subset of relay servers (e.g., relay servers $120_3$ and $120_4$ as illustrated by operation 830). Further, the transmission of the KVP from sender to relay utilizes traditional PKI encryption methods.

Further, the relay servers $120_1$-$120_N$ are RESTful web servers that exist to temporarily receive, store, and re-forward text-based key value pairs. Still further, a key segment of the cryptographic (OTP) key is sent as a key value pair (KVP) with GUID #1 (operation 830). Such transmissions to relay servers $120_1$-$120_N$ (e.g., relay servers $120_3$ and $120_4$) rely on TCP communications, and thus, a failed SYN-ACK triggers the sender to select an alternate relay server.

In another embodiment, upon receiving an inbound message including the key segments, the relay servers $120_2$ and $120_4$ inform, preferably in real-time, all known token authority servers (e.g., token authority server 110) of an acceptance of the inbound message. This is accomplished by forwarding the GUID #1 that was received, as well as the relay server's own unique IP address, to the token authority server 110 (operation 840). Further, the transmission of information between the relay servers $120_3$ and $120_4$ and the token authority server 110 utilizes traditional PKI encryption methods.

In another embodiment, upon receiving a notification from a relay server (e.g., relay server $120_3$) with a GUID #1, the token authority server 110 attempts to match with a recently received GUID #1 that it holds in its ephemeral memory (as transmitted by the message sender). Further, if a match exists, and this is the first unique instance of such a transmission from a relay server, then the token authority server 110 responds to the relay server $120_3$ with GUID #2 (as originally given to message sender). Still further, the original GUID #1, new GUID #2, and IP Address of the relay server $120_3$ is temporarily maintained in the ephemeral memory of the token authority server 110. Still further, if the token authority server 110 does not contain a matching GUID #1, or, if the notification is a duplicate from the relay server (or another relay server), then the token authority server 110 responds only with the original GUID #1 and does not update its own ephemeral memory store. In any case, the token authority server 110 responds to a relay's transmission with a form of GUID.

In another embodiment, the relay that notified the token authority server 110 with a GUID #1 and received a differing GUID #2 in response, shall update its ephemeral in-memory copy of the original GUID #1 that it holds and replace it as GUID #2 as the KVP with the key segment. Further, the relay server shall mark (maintain) that the GUID was changed.

In another embodiment, the DSG (keys) or "Xotic™ cipher" are transmitted from sender to receiver as a regular payload attachment to email in the form of email meta-data headers. Per U.S. Pat. No. 8,744,078, the cipher remains unusable as a decoding mechanism as it is an implementation of One-Time Pad (OTP) proven unbreakable cipher technology. Further, the GUID #2 as received by token authority server 110 is included in the email meta-data headers.

Further, the recipient's email application transmits a notification message to the token authority server 110 containing the GUID #2 that was included in the XFA email header (operation 850). Further, the token authority server 110 responds with the updated a list of IP addresses of the relay servers that contain the updated GUID #2 as stored in the ephemeral memory of the token authority server 110. If the token authority server 110 does not recognize the GUID being sent by the receiver 170, it responds with a random series of IP Addresses of known and valid relay servers 120$_1$-120$_N$, providing a false positive.

Still further, once the response has been transacted, the GUID KVP and associated data are expunged from the ephemeral memory of the token authority server 110. Still further, the request and response communication between recipient and token authority server 110 shall utilize traditional PKI encryption methods.

In another embodiment, the recipient's email application subsequently makes a connection to each of the relay systems listed by IP Address that the email application received from the token authority server 110. The updated GUID #2 is sent to the relay server whereby the relay server may respond with its segment of the fractured OTP key (operation 860). Further, upon failing to recognize the GUID being sent by the recipient, the relay responds with a randomly (or pseudo-randomly) generated number, providing a false positive.

Further, upon responding to the recipient's request, the relay server may immediately expunge KVP data containing the GUID #2 and key segment from its ephemeral memory. Still further, a relay server presented with a GUID identified as GUID #1 (original) may be configured to respond affirmatively with a randomly generated number, providing a false positive, then expunging their ephemeral memory.

Once the receiver 170 has received all keys segments for the cryptographic key from all relay servers 120$_1$-120$_N$, it recombines the key segments in a correct order based on information contained in the Xotic™ encrypted data header. The cryptographic key is then used to run Xotic™ cipher in reverse and decrypt the email message within the possession of the intended recipient.

An adaptation to the mechanism may include the ability for an expiry threshold to be set and determined by the sender 150, controlling the time to live (TTL) for data temporarily stored at the token authority server 110 as well as at relay servers 120$_1$-120$_N$. Further, all ephemeral information stored at the token authority server 110 and relay servers 120$_1$-120$_N$ automatically expunges within a designated default time-period. The implication to this is that XFA encrypted emails should be read within a designated time-period (either specified or default), or the email must be retransmitted.

Figure 9:
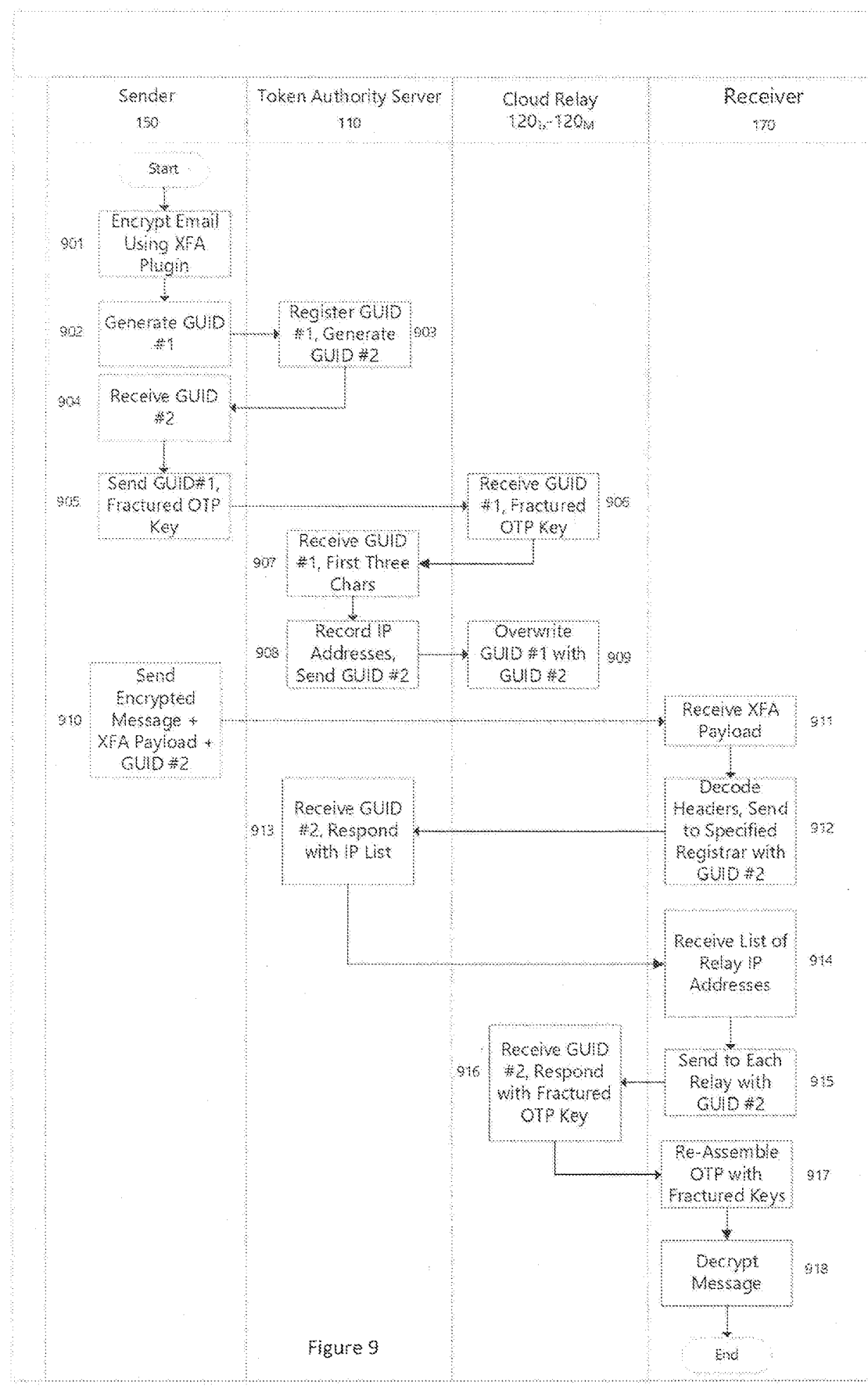
FIG. 9 is a logical flow diagram of an exemplary method of establishing secure double-blind hand-off of a one-time pad key.

Referring now to FIG. 9, a logical flow diagram of an exemplary method of establishing secure double-blind hand-off of a one-time pad key is shown. Herein, commencing at operation (901), the Java-based XFA plug-in in the Gmail account is triggered when the user presses the "send" button on their Gmail client. Upon invocation of the send-mail action, a cryptographic cipher, such as "Xotic" for example, fully encrypts the body, content, and attachments of the email. Xotic's onboard True Random Number Generator (TRNG) based on the Marsaglia "multiply with carry" (MWC) algorithm generates the One-time pad (OTP) key cipher, as well as the specific DSG vector that is included in the email payload (XFA) and attached as email meta-data.

After the start of encryption, at operation (902), the Gmail XFA plug-in generates a random (or pseudo-random) token (e.g., GUID) and transmits the token to one of a plurality of AWS token authority servers (e.g., token authority server 110). The URL of each of the three "trusted" AWS token authority servers are known to the plug-in internally and is thus identified by a specific index ID. The index ID is embedded into the encrypted Xotic™ header that is transmitted to the intended mail recipient so that the recipient can singularly identify the token authority server 110 that is used.

Corresponding with operation (903), the register( ) API method is invoked by the plug-in caller whereby the non-identifying GUID is passed in as a parameter. This transmission is protected using standard PKI-based encryption technology such as TLS (HTTPS) and is communicated to the server on port 443. The token authority server 110 accepts the GUID from the plugin and generates a second new GUID as the response message. The singular value returned in response is bracketed into standard JSON format. Internally, a singleton within the API maintains a Hash Map (lookup table) of the tokens (e.g., GUID values, stored as <String, String> objects). A timer thread is invoked which causes the Hash Map record to expire after a set time-period such as 60 minutes or a lesser time period. A variation of the invention allows for the expiry time-to-live (TTL) to be defined by the client user. To reduce the attack surface, a duplicative registry of the same GUID cause the in-memory record to be expunged and a replacement second-GUID to be created and returned in the subsequent response.

Once received in operation (904), the OTP key cipher is separated (i.e. fractured) into a variable number of pieces (key segments) of variable length at operation (905). Reference implementation for the number of key segments is a random (or pseudo-random) number ranging from [2] to [5] as an illustrative example, although a broader range may be used. Internal to the Gmail client plug-in is an up-to-date list of the IP Addresses (or URLs) of the various [45] cloud-based world-wide relay servers. It is assumed that the token authority server 110 maintains an up-to-date index of active cloud relay servers 120$_1$-120$_N$ which can be made available to the Gmail client plug-in on-demand. It is further assumed that automatic is implemented to register or de-register relay servers that are part of the key delivery network. Perpetual server maintenance and management of server records is beyond the scope of this invention description.

The Gmail client plug-in transmits two parameters (GUID #1, KEY SEGMENT) to a random (or pseudo-random) number of relay servers (decoys) by invoking the store( ) function on their respective API's. The decoys imply sending duplicative messages to relay servers in various locations to obfuscate and mitigate the possibility of man-in-the-middle attacks. Reference implementation for the number of decoys is also random (or pseudo-random) number ranging from [2] to [5], as an illustrative example.

The number of relay servers invoked may be equivalent to the [number of key segments] multiplied by [the number of decoys]. Based on ranges, the minimum number of relay servers contacted is a first prescribed number [e.g., 4], whereas the maximum number of relay servers contacted is a second prescribed number [e.g., 25]. The invention does not limit the number of relays, token authority servers, decoys, or key segments that can be used.

At operation (906), relay servers $120_1$-$120_N$ may be configured to not return a response value other than an HTTP 200 code when the transmission succeeds. The Gmail client plug-in selects from an alternate relay source if an HTTP 200 code is not received.

Like the token authority server 110, the relay servers $120_1$-$120_N$ also maintain an in-memory singleton with a Hash Map of <String, String> object type. In the case of the relay server; however, the key in the Hash Map is GUID #1 and the value is the key segment of the fragmented OTP key that was transmitted by the Gmail client plug-in.

Immediately upon receipt of new GUID information, relay servers fire requests to the notify( ) function of all known token authority servers. In the theoretical maximum of the reference implementation, this would imply [75] unique requests originating from various parts of the world, each directed at one of the [3] available token authority servers. At operation (907), the notify function accepts (GUID #1) and the (First-3 Characters) of the fragmented OTP key. If the key segment length is less than three characters, the first-three parameter is zero-padded to the right. The token authority server 110, having its own list of known relay servers, only accepts notify( ) commands from a known relay server.

At operation (908), an intentional race-condition takes place. Thus, the first relay server $120_1$ . . . , or $120_N$ to reach a token authority server (e.g., token authority server 110) that also has a matching copy of GUID #1 receives a response containing GUID #2. When this happens, the actual IP address of the relay server acting as the HTTP client is matched against the known list of relay IP addresses (internal to the token authority server) and appended to the in-memory Hash Map (of the token authority server) that contains GUID #1 and GUID #2. Additionally, the First-3 Characters of the shared OTP key are also appended to the KV-Pair record in the Hash Map of the token authority server.

The other two token authority servers that don't have GUID #1 simply echo's back GUID #1 to the calling relay. If the token authority server that has GUID #1 has already counted a request from a relay with the same First-3 Characters, it also echo's back GUID #1 to the calling relay.

From the relay's perspective at operation (909), receiving a response with the same GUID #1 as was the request parameter yields no further action. However; receiving a response from a token authority server that replies with a different GUID #2 than was sent-in as a parameter causes the relay to update its own internal Hash Map, swapping out GUID #1 for GUID #2 as its key in a key value pair and abandoning GUID #1 internally in ephemeral memory. The net effect of all relay servers completing their notifications (if using the theoretical maximum) would be as follows:

One of the three token authority servers (random or pseudo-random) is holding a list of 5 IP addresses of various relay servers (random or pseudo-random), along with GUID #1 and GUID #2 in ephemeral memory.

Each of the five (5) IP Addresses held in memory by the token authority server 110 represent a unique section of the fragmented OTP key. 20 relay servers (world-wide) have in ephemeral memory GUID #1 and a (possibly unique) key segment of the OTP key. 5 relay servers (world-wide) have in ephemeral memory GUID #2 and a definitively unique key segment of the OTP key.

To clarify the temporary ephemeral in-memory objects in Hash Maps (at this point) are:
Token authority server:
KEY1: [GUID #1]
VALUE: [GUID #2], [{IP1,123}], [{IP2,123}], [{IP23, 123}], [{IP4,123}], [{IP5,123}]
KEY 2: [GUID #2]
VALUE: Pointer to value-set of KEY1
Relay:
KEY 1: GUID #1 (or) GUID #2 . . . (This is random or pseudo-random) VALUE: [SHARED]

Operation (910) occurs within milliseconds and generally less than one second after the start of the entire process. Operation (906) and operation (910) occur in parallel. In this operation, a fully encrypted email is transmitted to the intended recipient over the standard public Gmail transmission medium. All normal internet hops are assumed. The email contains the XFA payload that includes Xotic™ headers, DSG Vectors, and GUID #2 as received from the token authority server in operation (904).

As the intended recipient receives an inbound email in operation (911), the content and attachments of the mail are fully encrypted and cannot be broken or deciphered without an OTP key cipher. It is the responsibility of the recipient at this point to locate the various key segments of the OTP key cipher and reassemble them. An email recipient without the Gmail client plug-in for XFA email cannot decode the email. The email itself should be decoded within a fixed period before the embedded ciphers expire.

At operation (912), the Xotic™ headers are parsed by the Xotic™ cipher onboard the Gmail client plug-in and the specific index ID of the token authority server that is maintaining the IP Address list is identified. The recipient's Gmail client plug-in makes an HTTP client request to the token authority server calling the recover( ) API function and passing GUID #2 as a parameter.

At operation (913), the recover( ) function returns the list of IP Address of various relay servers that are carrying specific key segments of the OTP Key cipher. In the event of a race-condition whereby all relay servers did not complete reporting-in all key segments by the time the recipient calls recover, a mismatch in the number of IP Addresses relative to the total number of key segments will become known to the Gmail client plug-in at operation (914). This condition is deterministic because the Xotic™ header contains the number of key segments that were generated by the sender 150. The user will be presented with a "please try again shortly" message when attempting to open the email. It is anticipated that the total amount of time between original message-send and total key segment reconciliation at the token authority server should not be more than several seconds in total. Thus, an email would likely need to be opened by the receiver 170 within a second of the time it was sent to meet this condition.

It should be noted that as a mechanism for lowering the attack surface of the token authority server 110 at operation (913), the token authority server 110 will yield random IP addresses of relay servers if GUID #1 or an invalid GUID is presented to the recover( ) function.

At operation (915) the email recipient's Gmail client plug-in queries each of the relays in its acquired IP Address list calling the relay API lookup( ) function. The parameter sent to the lookup( ) function is GUID #2 as a single parameter. At operation (916), relays containing the specific GUID in memory return their key segment values, whereas, a relay that does not contain the GUID returns a random (or pseudo-random) number. The always-positive response of a lookup( ) function lowers the attack surface of the relay significantly. The caller cannot know if the key segment they are returned is valid or not.

At operation (917), the fractured OTP key (key segments) are reassembled into a single key within the Gmail client plug-in. The Xotic™ header contains the correct sequencing of the key segments using the first-three characters of each segment.

Once the OTP key cipher has been reassembled, the Xotic™ cipher onboard the Gmail client plug-in is invoked and the email body, content, and attachments are rapidly decrypted and made readable to the intended recipient.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method comprising:
generating a first token;
providing the first token to a first network device;
receiving a first key value pair including the first token and a first key segment of a cryptographic key by a first relay server and receiving a second key value pair including the first token and a second key segment of the cryptographic key from a second relay server different than the first relay server;
generating a second token to be provided to the first relay server and the second relay server in response to a change token request message from both the first relay server and the second relay server; and
returning the first key segment from the first relay server and the second key segment by the second relay server in response to receipt of a message requesting key segments associated with the cryptographic key and the message including the second token to recover the cryptographic key for decryption of an encrypted content from the first network device.

2. The computerized method of claim 1 further comprising:
maintaining a count value representing a number of tokens issued for a subscriber associated with the first network device for use in encrypting transmissions.

3. The computerized method of claim 1, wherein the maintaining of the count value further comprising incrementing the count value pertaining to the subscriber in response to providing the first token to the first network device, the count value being used to determine a monetary amount to debit a pre-paid account associated with the subscriber.

4. The computerized method of claim 1, wherein prior to returning the first key segment from the first relay server and the second segment by the second relay server, the method further comprising:
receiving a message from a second network device inquiring of a converted token value based on the first token; and
returning a message including the second token in response to receipt of the first token.

5. The computerized method of claim 1, wherein the receiving of the first key value pair by the first relay server and the receiving of the second key value pair by the second relay server comprises
receiving the first key value pair including the first token and the first key segment of the cryptographic key by a third relay server and receiving the second key value pair including the first token and the second key segment of the cryptographic key by a fourth second relay server different than the third relay server; and
automatically retransmitting the first key value pair from the third relay server to the first relay server and the second key value pair from the fourth relay server to the second relay server.

6. The computerized method of claim 5, wherein the first relay server, the second relay server, the third relay server and the fourth relay server within a public cloud network.

7. The computerized method of claim 1, wherein the generating of second token to be provided to the first relay server and the second relay server is conducted by a token authority server including a token data store, token reassignment logic that, in response to the token change request message, generates the second token and associates the first token with the second token as a corresponding token pair with an entry of a data structure of the token data store, and a token lookup logic configured to access one or more entries within the data structure of the token data store using the first token as a lookup to recover the second token.

8. The computerized method of claim 1, wherein the first relay server and the second relay server are deployed within a public cloud network.

9. The computerized method of claim 2, wherein the generating of second token to be provided to the first relay server and the second relay server is conducted by a token authority server including a token data store, token reassignment logic that, in response to the token change request message, generates the second token and associates the first token with the second token as a corresponding token pair with an entry of a data structure of the token data store, and token counter logic that is configured to maintain and increase the count value associated with the subscriber, where the count value may be subsequently upload for billing of the subscriber via debiting a pre-paid account for the subscriber.

10. A computerized method comprising:
receiving a first key value pair including a first token and a first key segment of a cryptographic key from a first source and receiving a second key value pair including the first token and a second key segment of the cryptographic key from a second source different than the first source;
generating a second token to be provided to the first source and the second source in response to a change token request message from both the first source and the second source; and
returning the first key segment from the first source and the second key segment by the second source in response to receipt of one or more messages requesting key segments associated with the cryptographic key, the one or more messages including the second token for use by the first source to recover the first key segment and by the second source to recover the second key segment,
wherein the first key segment and the second key segment collectively forming the cryptographic key for decryption of an encrypted content transmitted over a network.

11. The computerized method of claim 10 further comprising:
  generating a first token; and
  providing the first token to a first network device that transmits the first key value pair to the first source and the second key value pair to the second source to transfer the cryptographic key from a first network device transmitting the encrypted content to a second network device receiving the encrypted content.

12. The computerized method of claim 11 further comprising:
  maintaining a count value representing a number of tokens issued for a subscriber associated with the first network device for use in encrypting transmissions.

13. The computerized method of claim 12, wherein the maintaining of the count value further comprising incrementing the count value pertaining to the subscriber in response to providing the first token to the first network device, the count value being used to determine a monetary amount to debit a pre-paid account associated with the subscriber.

14. The computerized method of claim 10, wherein prior to returning the first key segment from the first relay server and the second segment by the second relay server, the method further comprising:
  receiving a message from a second network device targeted to receive the encrypted content, the message inquiring of a converted token value based on the first token; and
  returning a message including the second token in response to receipt of the first token.

15. The computerized method of claim 10, wherein the receiving of the first key value pair from the first source and the receiving of the second key value pair from the second source comprises
  receiving the first key value pair including the first token and the first key segment of the cryptographic key by a third source and receiving the second key value pair including the first token and the second key segment of the cryptographic key by a fourth source different than the third source; and
  automatically retransmitting the first key value pair from the third source to the first source and the second key value pair from the fourth source to the second source.

16. The computerized method of claim 15, wherein the first source, the second source, the third source and the fourth source being deployed as relay servers within a public cloud network.

17. The computerized method of claim 10, wherein the generating of second token to be provided to the first source and the second source is conducted by a token authority server including a token data store, token reassignment logic that, in response to the token change request message, generates the second token and associates the first token with the second token as a corresponding token pair with an entry of a data structure of the token data store, and a token lookup logic configured to access one or more entries within the data structure of the token data store using the first token as a lookup to recover the second token.

18. The computerized method of claim 10, wherein the first source and the second source comprise a plurality of relay servers deployed within a public cloud network.

* * * * *